(12) United States Patent
Willey

(10) Patent No.: US 8,801,174 B2
(45) Date of Patent: Aug. 12, 2014

(54) ELECTRONIC FRAMES COMPRISING ELECTRICAL CONDUCTORS

(75) Inventor: Charles Willey, Roanoke, VA (US)

(73) Assignee: HPO Assets LLC, Farmington, CT (US)

( * ) Notice: Subject to any disclaimer, the term of this patent is extended or adjusted under 35 U.S.C. 154(b) by 0 days.

(21) Appl. No.: 13/372,240

(22) Filed: Feb. 13, 2012

(65) Prior Publication Data
US 2012/0262667 A1 Oct. 18, 2012

Related U.S. Application Data

(60) Provisional application No. 61/441,817, filed on Feb. 11, 2011.

(51) Int. Cl.
*G02C 1/00* (2006.01)
(52) U.S. Cl.
USPC .......................................................... 351/158
(58) Field of Classification Search
USPC ............................................. 351/158, 159.03
See application file for complete search history.

(56) References Cited

U.S. PATENT DOCUMENTS

| | | |
|---|---|---|
| 2,930,857 A | 3/1960 | Hollingsworth |
| 4,152,846 A | 5/1979 | Witt |
| 4,283,127 A | 8/1981 | Rosenwinket et al. |
| 4,418,990 A | 12/1983 | Gerber |
| 4,756,605 A | 7/1988 | Okada et al. |
| 4,875,030 A | 10/1989 | Chiu |
| 4,907,860 A | 3/1990 | Noble |
| 4,967,268 A | 10/1990 | Lipton et al. |
| 4,991,258 A | 2/1991 | Drlik |
| 4,991,951 A | 2/1991 | Mizuno et al. |
| 5,182,585 A | 1/1993 | Stoner |
| 5,463,428 A | 10/1995 | Lipton et al. |
| 5,657,107 A | 8/1997 | Wagner et al. |
| 5,742,379 A | 4/1998 | Reifer |
| 5,760,869 A | 6/1998 | Mitamura |
| 5,764,338 A | 6/1998 | Mack |
| 5,835,185 A | 11/1998 | Kallman et al. |

(Continued)

FOREIGN PATENT DOCUMENTS

| | | |
|---|---|---|
| DE | 2304134 | 8/1973 |
| EP | 0061002 | 9/1982 |

(Continued)

OTHER PUBLICATIONS

The International Search Report corresponding to the related PCT/US2012/051202 application.

(Continued)

*Primary Examiner* — Scott J Sugarman
*Assistant Examiner* — Mustak Choudhury
(74) *Attorney, Agent, or Firm* — Sterne, Kessler, Goldstein & Fox P.L.L.C.

(57) ABSTRACT

In some embodiments, a first device may be provided. The first device may comprise a lens housing adapted to support a first lens and a second lens, a first temple movably coupled to the lens housing, a second temple movably coupled to the lens housing, an electronics module disposed at least partially within the first temple, and a first electrical conductor coupled to the first temple. A first conductive path may be provided from the first temple to the lens housing at least in part by the first electrical conductor. The first electrical conductor may be configured to couple the electronics module to the first temple.

19 Claims, 30 Drawing Sheets

(56) References Cited

U.S. PATENT DOCUMENTS

| | | |
|---|---|---|
| 6,097,450 A | 8/2000 | Humphrey |
| 6,115,177 A | 9/2000 | Vossler |
| 6,336,250 B1 | 1/2002 | Takeda et al. |
| 6,582,075 B1 | 6/2003 | Swab et al. |
| 6,595,634 B1 | 7/2003 | Pilat, Jr. |
| 6,626,532 B1 | 9/2003 | Nishioka et al. |
| 6,719,425 B2 | 4/2004 | Conner |
| 6,866,386 B1 | 3/2005 | Chen |
| 7,009,757 B2 | 3/2006 | Nishioka et al. |
| 7,063,420 B2 | 6/2006 | Lerner et al. |
| 7,104,645 B2 | 9/2006 | Pilat, Jr. |
| 7,140,727 B2 | 11/2006 | Pilat, Jr. et al. |
| 7,425,066 B2 | 9/2008 | Blum et al. |
| 7,784,935 B2 | 8/2010 | Jackson et al. |
| 7,813,048 B2 | 10/2010 | Lynch et al. |
| 2001/0007493 A1 | 7/2001 | Masunaga et al. |
| 2001/0043266 A1 | 11/2001 | Robinson et al. |
| 2002/0140899 A1 | 10/2002 | Blum et al. |
| 2004/0000733 A1 | 1/2004 | Swab et al. |
| 2005/0078274 A1 | 4/2005 | Howell et al. |
| 2005/0225723 A1 | 10/2005 | Pilu |
| 2005/0237485 A1 | 10/2005 | Blum et al. |
| 2005/0239502 A1* | 10/2005 | Swab et al. ............... 455/556.1 |
| 2005/0242771 A1 | 11/2005 | Blum et al. |
| 2005/0264752 A1 | 12/2005 | Howell et al. |
| 2005/0270479 A1 | 12/2005 | Canavan et al. |
| 2005/0270481 A1 | 12/2005 | Blum et al. |
| 2006/0023158 A1 | 2/2006 | Howell et al. |
| 2006/0092340 A1 | 5/2006 | Blum et al. |
| 2006/0203186 A1 | 9/2006 | Ifergan |
| 2007/0121061 A1 | 5/2007 | Kim |
| 2007/0258039 A1 | 11/2007 | Duston et al. |
| 2007/0296918 A1 | 12/2007 | Blum et al. |
| 2008/0106695 A1 | 5/2008 | Kokonaski et al. |
| 2008/0273166 A1 | 11/2008 | Kokonaski |
| 2008/0316420 A1 | 12/2008 | Agazarova |
| 2009/0201460 A1* | 8/2009 | Blum et al. ............... 351/158 |
| 2010/0177277 A1 | 7/2010 | Kokonaski et al. |
| 2010/0201938 A1 | 8/2010 | Jackson et al. |
| 2010/0309426 A1 | 12/2010 | Howell et al. |
| 2011/0058141 A1 | 3/2011 | Cozzani |

FOREIGN PATENT DOCUMENTS

| | | |
|---|---|---|
| EP | 1647854 | 4/2006 |
| EP | 1727393 | 11/2006 |
| EP | 1916561 | 4/2008 |
| EP | 2233964 | 9/2010 |
| GB | 1563929 | 4/1980 |
| GB | 2170613 | 8/1986 |
| JP | 2008/083299 | 4/2008 |
| JP | 09294654 | 12/2009 |
| WO | WO 99/21400 | 4/1999 |
| WO | WO 01/02895 | 1/2001 |
| WO | WO 01/35159 | 5/2001 |
| WO | WO 2004/028203 | 4/2004 |
| WO | WO 2007/142520 | 12/2007 |
| WO | WO 2008/002388 | 1/2008 |
| WO | WO 2008/046858 | 4/2008 |
| WO | WO 2009/081542 | 7/2009 |
| WO | WO 2009/098719 | 8/2009 |
| WO | WO 2009/126946 | 10/2009 |
| WO | WO 2009/136667 | 11/2009 |
| WO | WO 2010/062504 | 6/2010 |
| WO | WO 2010/080999 | 7/2010 |

OTHER PUBLICATIONS

The International Preliminary Report on Patentability corresponding to the PCT/US2011/042882 application.
U.S. Appl. No. 61/361,110, filed Jul. 2, 2010.
U.S. Appl. No. 61/376,719, filed Aug. 25, 2010.
U.S. Appl. No. 61/415,391, filed Nov. 19, 2010.
U.S. Appl. No. 12/684,490, filed Jan. 8, 2010.
U.S. Appl. No. 13/175,633, filed Jul. 1, 2011.
U.S. Appl. No. 13/175,634, filed Jul. 1, 2011.
U.S. Appl. No. 61/362,877, filed Jul. 9, 2010.
U.S. Appl. No. 13/179,219, filed Jul. 8, 2011.
U.S. Appl. No. 61/481,353, filed May 2, 2011.
U.S. Appl. No. 61/441,817, filed Feb. 11, 2011.
International Search Report corresponding to the PCT/US2011/042883 application.
International Search Report corresponding to the PCT/US2011/042882 application.
International Search Report and Written Opinion in corresponding PCT/US2008/058056 application.
Partial International Search Report in corresponding PCT/US2010/020498 application.
European Search Report in related EP07852880.9 application.
"Hearing Mojo: Varibel Hearing-Aid Glasses Integrate Eight Directional Microphones," Feb. 27, 2009, pp. 1-4 URL-http://hearingmojo.com/b/og-mt/blog-mt/2006/04/varibel_hearingaid_glasses_dou.html.
International Search Report corresponding to the PCT/US2011/061505 application.
International Search Report corresponding to the PCT/US2011/061495 application.
International Search Report corresponding to the PCT/US2011/043591 application.

* cited by examiner

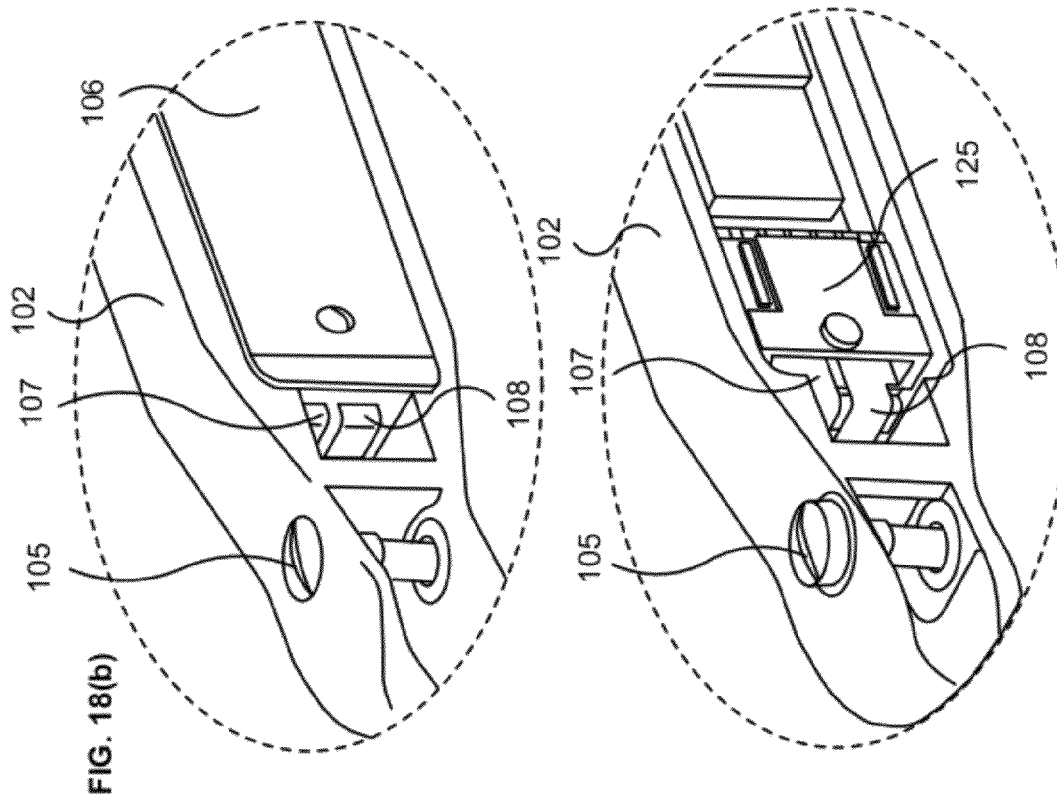
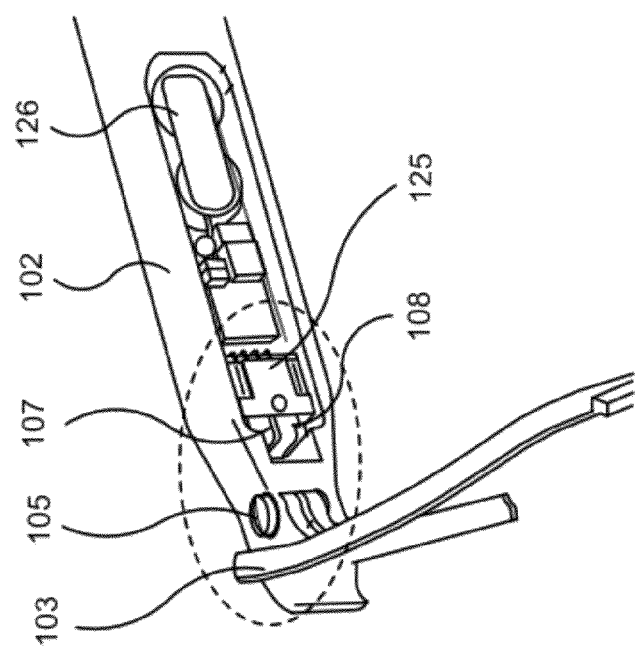

ELECTRONIC FRAMES COMPRISING ELECTRICAL CONDUCTORS

CROSS-REFERENCES TO RELATED APPLICATIONS

This application claims benefit under 35 U.S.C. §119(e) of U.S. provisional patent application No. 61/441,817, filed on Feb. 11, 2011, the entire disclosure of which is incorporated herein by reference for all purposes.

BACKGROUND OF THE INVENTION

In today's world, spectacle eyeglass frames are very fashionable. While the trend for the eyeglass lenses is to make them thinner, lighter, and less visible, at the same time, it is the eyeglass frame that makes the fashion statement for the eyeglass wearer.

Concurrent with these trends is another trend concerning the inclusion of electronic components and devices into spectacle eyewear. The trend of utilizing electronics in eyewear appears to be accelerating and the applications being developed by others are expanding. As theses trends continue, it is becoming increasingly relevant to find ways to incorporate electronics into eyewear without harming the aesthetics and functionality of the eyewear. In addition, it may be desirable that the inclusion of electronics not limit the fashion design of the eyeglass frame or limit the materials of eyeglass frame. It may also be desirable to reduce the number of stock keeping units (SKUs) of completed eyeglass frames or eyeglass frame components (frame fronts, bridges, temples, etc.), and to allow for robust placement of the electronics on or within the frames. It is also generally desirable to provide for efficient design and manufacturing of the eyeglass frames and components.

BRIEF SUMMARY OF THE INVENTION

Some embodiments provided herein may include a device or apparatus (such as eyeglass frames) having one or more conductors that may be utilized to form a part of a conductive path from the temple to the lens housing of the frames. The one or more conductors may be coupled to one of the temples of the frames and may be configured in such a way so that they may hold the electronic components of the frames (or an electronics module that comprises one or more electronic components) in place, such as within a cavity of the temple. Some embodiments provided herein may also include a method of manufacturing a device or apparatus such as an electronic eyeglass frame that includes disposing electronic components on a capacitive touch switch and then coupling the capacitive touch switch to an enclosure (such as an electronics module) in such a way that the electronic components that were disposed on the capacitive touch switch are substantially enclosed by the enclosure.

In some embodiments, a first device may be provided. The first device may comprise a lens housing adapted to support a first lens and a second lens, a first temple movably coupled to the lens housing, a second temple movably coupled to the lens housing, an electronics module disposed at least partially within the first temple, and a first electrical conductor coupled to the first temple. A first conductive path may be provided from the first temple to the lens housing at least in part by the first electrical conductor. The first electrical conductor may be configured to couple the electronics module to the first temple. In some embodiments, the first electrical conductor may be configured to constrain the electronics module.

In some embodiments, in the first device as described above, the first electrical conductor may be integrally coupled to the first temple. In some embodiments, the first electrical conductor may be insert-molded with the first temple. In some embodiments, in the first device as described above, the first electrical conductor may comprise a lug.

In some embodiments, in the first device as described above, the first device may further comprise a second electrical conductor coupled to the first temple. A second conductive path may be provided from the first temple to the lens housing at least in part by the second electrical conductor. The second conductive path may be electrically isolated from the first conductive path. The second electrical conductor may be configured to couple (e.g. constrain) the electronics module. In some embodiments, the second electrical conductor may be integrally coupled to the first temple. In some embodiments, the second electrical conductor may be insert-molded with the first temple. In some embodiments, in the first device as described above, the second electrical conductor may comprise a lug.

In some embodiments, in the first device as described above, the electronics module may comprise any two of: a power source, a controller, and a sensor. In some embodiments, where the electronics module comprises a sensor, the sensor may comprise a touch switch. In some embodiments, the touch switch is any one of a membrane switch or a capacitive touch switch.

In some embodiments, in the first device as described above, the first electrical conductor may be electrically coupled to a slip ring. In some embodiments, the first device may further comprise a hinge and the slip ring may be disposed substantially within the hinge. In some embodiments, the slip ring may comprise a part of the hinge.

In some embodiments, in the first device as described above, the electronics module may be configured to be removably coupled to the first temple. In some embodiments, the electronics module or a component thereof may be removably coupled to the first electrical conductor.

In some embodiments, in the first device as described above, the electronics module may include an opening. In some embodiments, the first electrical conductor may have a first portion that extends a first distance of at least approximately 1 cm into the electronics module through the opening. In some embodiments, the first electrical conductor may have a second portion that extends a second distance of at least approximately 1 cm outside of the electronics module away from the opening. In some embodiments, the first distance that the first portion of the first electrical conductor extends into the electronics module may be at least approximately 2 cm. In some embodiments, the second distance that the second portion of the first electrical conductor extends away from the opening may be at least approximately 2 cm.

In some embodiments, in the first device as described above, the first electrical conductor may comprise a single structural element. In some embodiments, in the first device as described above, the first electrical conductor may be configured to maintain the first conductive path as the first temple is moved relative to the lens housing.

In some embodiments, in the first device as described above, the first device may further comprise a first lens coupled to the lens housing. In some embodiments, the first lens may include a first electrical contact. The first conductive path may be electrically coupled to the first electrical contact. In some embodiments, where the first device further comprises a second electrical conductor coupled to the first temple and a second conductive path is provided from the first temple to the lens housing at least in part by the second electrical conductor, the lens may further include a second electrical contact. The second conductive path may be electrically coupled to the second electrical contact.

In some embodiments, a first method may be provided. The first method may include the steps of providing a capacitive touch switch, disposing a plurality of electronic components on the capacitive switch, and coupling the capacitive touch switch to a partial enclosure.

In some embodiments, in the first method as described above, the first method may further include the step of electrically coupling one or more of the plurality of electronic components to the capacitive touch switch. In some embodiments, the step of electrically coupling one or more of the plurality of electronic components to the capacitive touch switch may comprise reflow soldering.

In some embodiments, in the first method as described above, the first method may further include the step of electrically coupling one of the plurality of electronic components to another of the plurality of electronic components.

In some embodiments, in the first method as described above, the first method may further include the step of coupling the enclosure to a temple of an eyeglass frame. In some embodiments, the step of coupling the enclosure to the temple of the eyeglass frame may comprise disposing the enclosure substantially within the temple of the eyeglass frame. In some embodiments, the eye glass frame may comprise an electro-active eyeglass frame. In some embodiments, the eyeglass frame may comprise a first conductive path and the first method may further comprise the step of electrically coupling at least one of the electronic components to the first conductive path. In some embodiments, the first conductive path may be electrically coupled to an electro-active lens. In some embodiments, the first conductive path may comprise anyone of, or some combination of: a slip ring and a pogo pin. In some embodiments, where the first conductive path includes a slip ring, the first conductive path may further comprise a lug coupled to the slip ring. In some embodiments, the lug may be integrally coupled to the temple. In some embodiments, the first method may further include the step of insert molding the lug into the eye glass frame. In some embodiments, the lug may be disposed on the capacitive touch switch.

In some embodiments, in the first method as described above, the enclosure may comprise an electronics module. In some embodiments, the enclosure may comprise a temple of an eyeglass frame.

In some embodiments, in the first method as described above, the first method may further comprise the step of applying a conformal coating to the plurality of electronic components. In some embodiments, the conformal coating may comprise brushed, spray, or dip applied acrylic, silicone, or epoxy. In some embodiments, the first method may further include the step of masking a portion of the electronic components such that an electrical contact is exposed through the conformal coating. In some embodiments, the first method may further include the step of removing a portion of the conformal coating to expose an electrical contact of one or more of the plurality of electronic components.

In some embodiments, in the first method as described above, the plurality of electronic components may comprise any one of, or some combination of: a flexible circuit, a printed circuit board, or an electrical connector. In some embodiments, the plurality of electronic components may include a power source.

In some embodiments, in the first method as described above, the capacitive touch switch and the enclosure may be configured to be pressure fitted.

In some embodiments, in the first method as described above, the capacitive touch switch may be coupled to the enclosure using any one of, or some combination of: a fastener or an adhesive.

In some embodiments, in the first method as described above, the capacitive touch switch may comprise a stiff material. In some embodiments, in the first method as described above, the capacitive touch switch may comprise a rigid, molded plastic such as a liquid crystal polymer or other plastic engineered for ablation and plating.

In some embodiments, a method may be provided. The method may include the steps of providing a substrate (such as a surface of touch switch), disposing a plurality of electronic components on the substrate, electrically coupling one of the plurality of electronic components to another of the plurality of electronic components, coupling the substrate to a partial enclosure, and coupling the enclosure to a temple of an eyeglass frame. In some embodiments, the step of coupling the enclosure to the temple of the eyeglass frame may comprise disposing the enclosure substantially within the temple of the eyeglass frame.

BRIEF DESCRIPTION OF THE DRAWINGS

FIG. 16 further shows the outline of the temple.

FIGS. 18(a)-(c) include illustrations of a portion of the temple of the exemplary electronic eyewear in accordance with some embodiments. FIG. 18(a) shows the exemplary eyewear having a plurality of electronic components disposed within the temple and coupled therein by electrical conductors. FIG. 18(b) shows an embodiment where an electronics module is disposed within the temple and coupled thereto by electrical conductors. FIG. 18(c) shows a transparent view of the electronics module shown in FIG. 18(b) to illustrate the electrical conductors coupling to an electronic component therein.

DETAILED DESCRIPTION OF THE INVENTION

Figure 1:
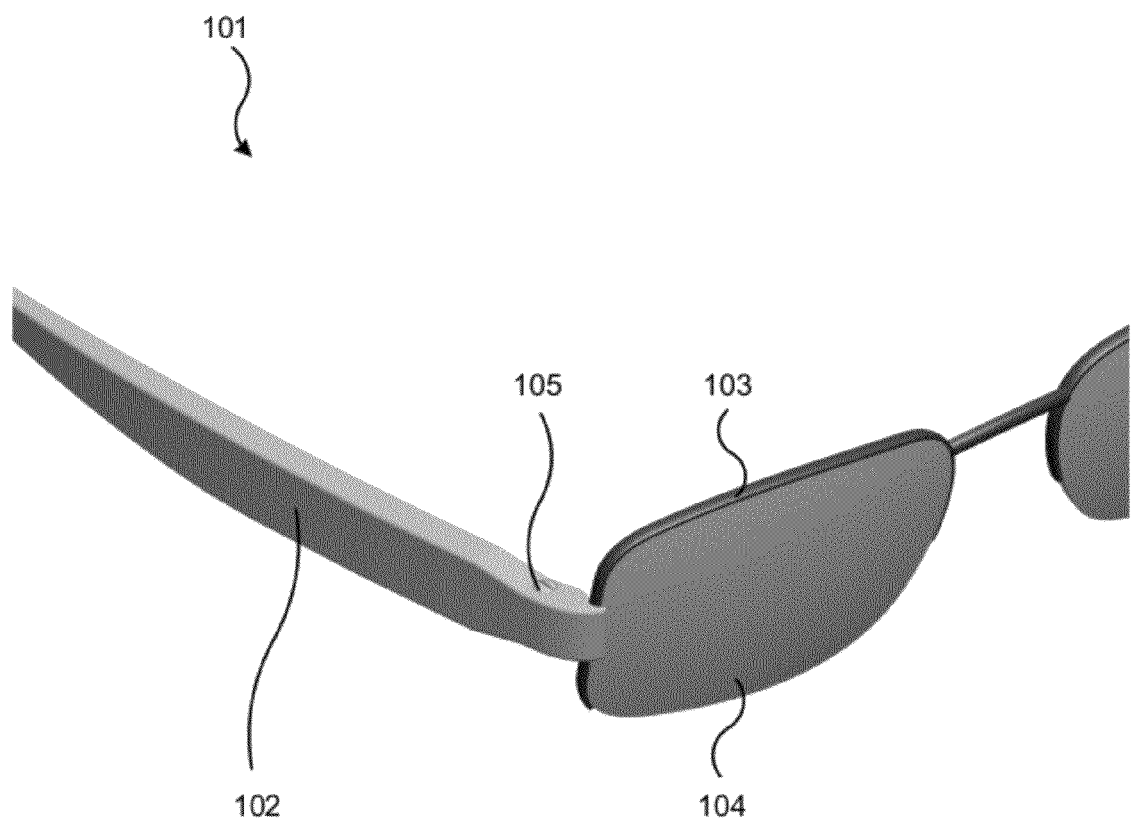
FIG. 1 is an illustration of exemplary electronic eyewear from a front view in accordance with some embodiments.

Some terms that are used herein are described in further detail as follows:

As used herein, the term "approximately" may refer to plus or minus 10 percent, inclusive. Thus, the phrase "approximately 10 mm" may be understood to mean from 9 mm to 11 mm, inclusive.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between (or within) some or all of the components.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw or embedding a first component into a second component during a manufacturing process), but does not so require. Two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "dynamic lens" may refer to a lens with an optical power which is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. The switching may comprise a discrete change from one optical power to another (such as going from an "off" or inactive state to an "on" or active state) or it may comprise continuous change from a first optical power to a second optical power, such as by varying the amount of electrical energy to a dynamic element (e.g. tunable). One of the optical powers may be that of substantially no optical power. A dynamic lens may also be referred to as a dynamic optic, a dynamic optical element, a dynamic optical zone, dynamic power zone, or a dynamic optical region.

As used herein, "electro-active spectacles," "electronic spectacles," "electro-active spectacle frames," "electronic spectacle frames," "electro-active eyeglasses," "electro-active eyeglass frames," "electro-active frames," "electro-active lenses" or any permutation of "electro-active" or "electronic" may broadly refer to any eyeglass frame or lens that comprises an electronic component or components. The electrical components can be coupled to any part of the electro-active (e.g. electronic) frames or lenses. This may comprise, for instance, any and all uses whereby the eyeglass frames house some, most, or all of the electronics and/or the lens comprises a component or components that may be activated and/or deactivated by an electrical current or voltage. Examples include: electronic focusing eyeglasses, electro-chromic eyeglasses, electronic tinted eyeglasses, eyeglasses comprising a micro-display allowing for viewing a digital image in space, eyeglasses comprising an electronic heads up display, eyeglasses that comprise an antistatic element to keep the eyeglass lenses clean, electronic shutter eyeglasses for viewing 3D images, electronic eyeglasses that comprise an occlusion control for vision training; electronic eyeglasses for myopia control, eyeglasses that comprise a component of a telescope or the complete telescope, eyeglasses that comprise a microscope, eyeglasses that comprise a camera, eyeglasses that comprise a directional microphone, eyeglasses that comprise a rangefinder, eyeglasses that comprise an image intensifier, eyeglasses that comprise a night vision enhancement feature, occupation eyeglasses, gaming eyeglasses; eyeglasses that may comprise electronic components to provide a user with functionality for receiving input from a wearer and performing a specific operation in response, such as providing information to the wearer—e.g. a virtual personal assistant (that is, eyeglasses that may comprise electronic components such as an input device (e.g. a microphone) for receiving signals (e.g. commands or questions) from a wearer; a micro-processor that may process the input received from the wearer and determine an appropriate action or response; a memory or other storage device that may store associations between input received and predetermined functions; voice recognition software for identifying the information in an input received from a wearer; an output device (e.g. a speaker) for communicating or signaling information to a wearer, etc.). It should be understood that the above is not intended to be an exhaustive list, and that any functionality or components may be included in such frames.

As used herein, an "electronic component" or "electrical component" may refer to any electronic device or component thereof, including a power source, a controller (such as a microprocessor or application-specific integrated circuit (ASIC)), a sensing mechanism (such as a touch switch—e.g. capacitive switch or membrane switch-, optical sensor, accelerometer, gyroscope, vibration sensor, etc.), flexible circuit, printed circuit board, electrical connectors, or any other device or component that may be coupled to, and/or disposed on, an electronic frame.

As used herein, an "electronics module" may refer to a housing or container that may comprise one or more electronic components disposed therein. For instance, an electronics module may comprise a power source (such as a battery), a sensing mechanism (such as a capacitance switch, which may activate or deactivate the electronics) and/or a controller (such as a microprocessor). In some embodiments, an electronics module may comprise an outer casing that may substantially encircle or encapsulate the one or more electronic components. By "substantially encapsulate," it is generally meant that in some embodiments, the outer casing may have one or more openings that enable interaction with the electronic components that are disposed therein, such as one or more conductive paths that may be provided from an electronic component or components disposed on the frame or lens housing to one or more components within the electronics module. The electronics module may also comprise an opening or openings that allow a user to interact with the components therein, such as to provide access to a touch sensitive switch.

As used herein, a "frame" may refer to a complete wearable housing that secures both spectacle lenses and aligns them in the proper place relative to the wearer's eyes when being worn. The frame may comprise elements such as a first and second temple, a lens housing that is configured to support the spectacle lenses, one or more hinges, and any other related component.

As used herein, a "hinge" may refer to the part of the frame that allows for connecting the lens housing and the temples in such away that the lens housing and the temple can open and close against the lens housing on its posterior side when not being worn. In some embodiments, the hinge may connect directly to the lens. In some embodiments, the hinge may be considered a part of, or disposed within the temple or the lens housing.

As used herein, a "lens" may refer to any device or portion of a device that causes light to converge or diverge. The device may be static or dynamic. A lens may be refractive or diffractive. A lens may be concave, convex or plano on one or both surfaces. A lens may be spherical, cylindrical, prismatic or a combination thereof. A lens may be made of optical glass, plastic or resin. A lens may also be referred to as an optical element, an optical zone, an optical region, an optical power region or an optic. It should be noted that within the optical industry a lens can be referred to as a lens even if it has zero optical power. Moreover, a lens may refer to both intra-ocular and extra-ocular components.

As used herein, a "lens blank" refer to an optical material that may be shaped into a lens. A lens blank may be finished meaning that the lens blank has been shaped to have an optical power on both external surfaces. A lens blank may be semi-finished meaning that the lens blank has been shaped to have an optical power on only one external surface. A lens blank may be unfinished meaning that the lens blank has not been shaped to have an optical power on either external surface. A surface of an unfinished or semi-finished lens blank may be finished by means of a fabrication process known as free-forming or by more traditional surfacing and polishing.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprising a single component or two components that support both the first and the second lens. Moreover, as used herein, reference to a "lens" also includes any suitable optic or optical component. That is, the lens housing may hold any optical component, and need not necessarily comprise a lens that has a focal point (e.g. a lens could include a piece of glass or plastic that may serve any purpose). For example, a "lens" as used herein may refer to optical components that may project or maintain an imaginary image perceivably by viewer and/or be used in heads-up displays, video games, checking electronic mail, and/or any other suitable manner.

As used herein, an "ophthalmic lens" may refer to a lens suitable far vision correction which includes a spectacle lens, a contact lens, an intra-ocular lens, a corneal in-lay, and a corneal on-lay.

As used herein, "optical communication" may refer to the condition whereby two or more optics of given optical power are aligned in a manner such that light passing through the aligned optics experiences a combined optical power equal to the sum of the optical powers of the individual elements.

As used herein, a "temple" may refer to a side piece of a frame that connects to the lens housing (or directly to the lens), and further provides stability by resting on the wearer's ears when worn. The temple may be a "hinge-less temple" (i.e. a side piece of a frame that connects to the lens housing (or directly to the lens) without a hinge attachment mechanism) or a "hinged temple" (i.e. a side piece of a frame that connects to the lens housing (or directly to the lens) using a hinge attachment mechanism). As noted above, in some embodiments, a hinge may be considered to be part of the temple. The temples may comprise any material, including metal or plastic.

As used herein, reference to a "first" or a "second" does not limit the referenced component to a particular location unless expressly stated. For instance, reference to a "first temple" may comprise the temple located on either the left side or the right side of a wearer's head.

Coupling Electrical Conductor Embodiments

In general, electronic eyeglasses may include electronic components that may be located on different parts of the frames or may include electro-active lenses that utilize electrical power and/or control signals. In many instances, the power source, controllers, and/or sensors may be located in different locations than the electronic devices that they may control or power. Thus, conductive paths are generally provided within the electronic eyeglass frames, including within the temples and the lens housing, or between different portions of the frames. Given the daily stress and forces that are consistently applied to eyeglass frames, as well as the aesthetic demands of eyewear, there is a general need to design and effectuate electrical connections that provide robust performance, as well as potentially limiting or reducing the visibility of such connections on the frames themselves.

Some embodiments provided herein may comprise an electrical conductor (such as a lug) that may be disposed in, or coupled to, one of the temples of an electronic eyeglass frame that may both provide a part of a conductive path from the temple to the lens housing, as well as securing electronic components (or an electronics module that may hold one or more electronic components) to the temple. That is, for example, the electrical conductor may be configured in such a way that it may hold (or secure) an electronics module in place on the frames (i.e. coupled to and/or within the temple). In this manner, the inventors have found that, in some embodiments, such electrical conductors may provide for a more robust electrical connection from the electrical components disposed within the electronics module to other components on the frame (such as those that may be located on the lens housing). This may be due, in part, to the configuration of the electrical conductors to apply a force to the electronic module or the components therein, which may thereby maintain the electrical contact even when the eyewear is in use. Moreover, utilizing a conductor in this manner may also reduce the need to use multiple fasteners for the electronics module because, for instance, at least a portion (e.g. one side of) the electronics module may be held in place by the electrical conductor. In addition, in some embodiments, manufacturing and fabrication costs may be reduced because the conductors may be formed with, and or coupled to, the temple prior to coupling or disposing the electronics module in the temple. This may enable machine fabrication methods, thereby reducing costs and manufacturing time as well as potential human error.

In some embodiments, a first device may be provided. The first device may comprise a lens housing adapted to support a first lens and a second lens, a first temple movably coupled to the lens housing, a second temple movably coupled to the lens housing, an electronics module disposed at least partially within the first temple, and a first electrical conductor coupled to the first temple. A first conductive path may be provided from the first temple to the lens housing at least in part by the first electrical conductor. The first electrical conductor may be configured to couple the electronics module to the first temple. Exemplary embodiments are illustrated in FIGS. 1-18 and described in more detail below.

The first electrical conductor may couple the electronics module to the temple in any suitable manner. For example, the electrical conductor may apply a force to the electronics module and/or the first electrical conductor may be configured to structurally connect (or interconnect/interlock) with the electronics module (i.e. a structural component of the electronics module) or a component therein (e.g. an electrical connector, circuit board, or electronic device or component). For example, the electronics module may have an opening through which the first electrical conductor may be inserted into the electronics module, and may thereby apply a force to hold the electronics module in place and thus coupled to the first temple. This is illustrated in the exemplary embodiments shown in FIGS. 12-14 and described in more detail below. The force may be applied, for instance, based in part on the rigidity of the first electrical conductor, which may be based on both the material that comprises the first electrical conductor as well as the manner in which the first electrical conductor is coupled to the temple (for instance, if the first conductor is insert molded into the temple, then the first electrical conductor may provide more structural rigidity in coupling the electronics module to the temple). The first electrical conductor need not continually apply a force to the electronics module or the components therein, but could apply a force when the electronics module begins to move in a particular direction—e.g. a restraining force—and thereby restrict the movement of the module and thus couple the module to the temple. In some instances, the electrical conductor may couple the electronics module to the first temple alone or in combination with other components or means. For instance, the electrical conductor may couple one side of the electronics module to the first temple, and the other side may be coupled to the temple using an adhesive, a screw, or it may be structurally connected (e.g. pressure fitted) to the temple. However, any suitable manner of coupling the electronics module or portions thereof may be utilized.

In some embodiments, one or more electrical contacts may be disposed within the electronics module, which may be electrically coupled to the first electrical conductor. These electrical contacts may comprise separate conductors (e.g. wires or other conductive material), electrical connectors, or could comprise portions of the electronic components, such as portions of a printed circuit board or flexible circuit. It should be noted that, as used herein, an "electrical conductor" may refer to any material or component that can be used to conduct electric signals or power. The conductor may comprise a single component or a plurality of components.

The term "disposed at least partially within the first temple" as used in this context is meant to include embodiments where the electronics module may be contained within the periphery of the structure of the temple, as well as embodiments in which a portion of the electronics module may not be disposed within the periphery of the temple. That is, for example, in some embodiments portions of the electronics module may protrude through, or be disposed outside of, the structure of the temple. One such example (which is provided for illustration purposes) may be when the electronics module comprises a touch sensitive switch, such as a capacitive switch or a membrane switch, that has at least a portion that is exposed through the temple such that it may interact with a user (such as a user's finger). It should be noted that, although the electronics module may be disposed within the temple, it need not be "covered" by the temple. This is shown for instance in FIG. 13, where the electronics module is shown as being disposed within a cavity of the temple, but the module is not covered on one side (in this case the side of the electronics module that faces the wearer). This may correspond to embodiments that enable the wearer to couple and decouple the electronics module to the temple, which may provide for easier repair and maintenance as well as the flexibility to use multiple electronics module with a single electronic frame. In some embodiments, the device may include a cover that may be disposed over the exposed side of the electronics module so as to provide a finished appearance to the device, as well as to protect any components disposed within the temple from the external environment.

In some embodiments, the first electrical conductor may be configured to constrain or substantially constrain the electronics module. As used in this context, "constrain" may refer to when the first electrical conductor is configured to provide support (i.e. a restraining force) for the electronics module to retain the module in a fixed position within the temple. That is, the first electrical conductor may be configured to hold the electronics module in place. As noted above, the first electrical conductor may be integrally coupled to the temple (such as insert molded or otherwise affixed to the temple), and may be inserted through an opening of the electronics module and apply pressure to a surface or a component therein, which thereby restricts the module from being removed from the temple or moved within the temple. In this manner, the conductor may hold or restrain one end of the electronics module in place (or substantially in place). The term "substantially constrain" is used in this context to account for some minor movement of the electronics module within the temple, but the conductor may generally hold the electronics module within the temple in place (such that it remains in an operative position).

In some embodiments, in the first device as described above, the first electrical conductor may be integrally coupled to the first temple. The term "integrally coupled" as used in this context may refer to when the first electrical conductor is coupled to the temple in such a manner that it cannot readily be removed without damaging or otherwise affecting the structure of the temple. In some embodiments, the first electrical conductor may be insert-molded into the first temple. As used in this context, "insert molded" may refer to when, for instance, during the manufacturing of the temple the material that comprises the temple (e.g. a plastic material in some embodiments) may be injected into a cavity (which is typically in the shape of the temple or a portion thereof) and around the first electrical conductor that is disposed in the cavity prior to the molding process. This may result in the first electrical conductor being encapsulated by the material that comprises the temple. A portion of the first electrical conductor may remain un-encapsulated so as to form electrical connections and/or couple the electronics module to the temple. Embodiments where the first electrical conductor is insert molded may provide the advantage of a more efficient manufacturing process because the first electrical conductor need not be separately coupled to the temple or other part of the frame. In addition, the portions of the first electrical conductor that may be encapsulated by the temple may be isolated from the external environment and thereby be less susceptible to failure (such as electrical shorts) or damage.

In some embodiments, in the first device as described above, the first electrical conductor may comprise a lug. As used in this context, a "lug" may refer to a copper, brass, or any other conductive material that constitutes a fitting to which electrical wires or conductors may be soldered or otherwise electrically coupled to so as to form a conductive path. In other words, the first conductor may form an electrical connection between two other electrical components (such as wires, components of a slip ring, soldered components, PCB, electrical circuits, etc.).

In some embodiments, in the first device as described above, the first device may further comprise a second electrical conductor coupled to the first temple. A second conductive path may be provided from the first temple to the lens housing at least in part by the second electrical conductor. The second conductive path may be electrically isolated from the first conductive path. That is, for instance, embodiments may provide more than one conductive path from the components of an electronics module to other components on the electronic frame. This may enable the components of the electronics module to provide power, control signals, or both to components disposed outside of the electronics module. The second electrical conductor may also be configured to couple the electronics module to the first temple. For example, both the first electrical conductor and the second electrical conductor may each provide a portion of the force that holds or restrains the electronics module within the temple. This may provide for increased stability, as there may be multiple components providing a force to the electronics module or the components thereof in different locations to constrain the electronics module within the temple. In some embodiments, the second electrical conductor may be integrally coupled to the first temple—e.g. the second electrical conductor may be insert-molded into the first temple. In some embodiments, in the first device as described above, the second electrical conductor may comprise a lug.

In some embodiments, in the first device as described above, the electronics module comprises any two of: a power source, a controller, and a sensor. A power source could include, by way of example only, a battery or a capacitor. The controller may be configured to receive a signal from a sensor and determine whether to activate or deactivate an electronic device, or otherwise be configured to control the functionality of an electronic component. A controller could include, by way of example, a micro-processor or an ASIC. In some embodiments, where the electronics module comprises a sensor, the sensor may comprise a touch switch. In some embodiments, the touch switch is any one of a membrane switch or a capacitive touch switch. However, any suitable sensor may be utilized such as, by way of example, a membrane switch, an analog switch, a gyroscope, or an accelerometer.

In some embodiments, in the first device as described above, the first electrical conductor may be electrically coupled to a slip ring. A slip ring may comprise any device or combination of devices designed to make an electrical connection through a rotating assembly. An example of a slip ring connection is shown and described with respect to FIGS. 15 and 16. In some embodiments, the electrical conductor may comprise a part of a slip ring or slip ring component. In some embodiments, the first device may further comprise a hinge and the slip ring may be disposed substantially within the hinge. In some embodiments, the slip ring comprises a part of the hinge. For example, the temple may be connected to a portion of the lens housing by a hinge, where the hinge is electrically conductive (or a portion thereof is electrically conductive). Thus, as the hinge rotates (and thereby the temple moves from a first position relative to the lens housing to second position relative to the lens housing), the hinge may be configured to maintain electrical contract with the first electrical conductor (and thereby maintain the first conductive path). Embodiments may provide advantage of continuously providing electric power or signals from one or more components disposed within the electronics module to one or more components outside of the electronics module (e.g. disposed on the lens housing), particularly where the temples may not be perpendicular to the lens housing.

In some embodiments, in the first device as described above, the electronics module may be configured to be removably coupled to the first temple. That is, in some embodiments, the first electrical conductor may constrain the electronics module when it is disposed within the temple such that, during normal use, the electrics module remains in place. However, the electronics module and/or the electrical conductor may be configured such that the module may also be removed from the temple without damaging the temple. This may require that the wearer apply a force to the electronics module that would not be typical during regular use (e.g. when worn by a user, or even dropped or slept on) such as tilting the eyewear, applying a force in a particular direction to the electronics module, and/or removing or loosening one or more fasteners (such as removing a screw that may be holding a part of the electronics module in place). The removed electronics module (or a new electronics module) may be reinserted into the temple and again constrained by the first electrical conducted such that the module is again coupled to the temple and held in place. For instance, as described above, the electronics module may have an opening such that when the module is placed into the first temple, a portion of the first electrical conductors are inserted through the opening and apply a force to the module to hold it against, or disposed within, a cavity of the first temple. Similarly, in some embodiments, the electronics module or a component thereof may be removably coupled to the first electrical conductor.

In some embodiments, in the first device as described above, the electronics module may include an opening. As noted above, the opening in the electronics module may not only be used to enable the first electrical conductor to couple the electronics module to the first temple in some embodiments, but may also enable the first electrical conductor to establish an electrical connection with, or otherwise interact with, the electronic components disposed therein. In some embodiments, the first electrical conductor may have a first portion that extends a first distance of at least approximately 1 cm into the electronics module through the opening. In some embodiments, the first electrical conductor may have a second portion that extends a second distance of at least approximately 1 cm outside of the electronics module away from the opening. That is, for example, in some embodiments, the first electrical conductor has a portion that is disposed within the electronics module and a second portion that is not disposed within the electronics module. The first portion that extends into the electronics module may for an electrical contact to one or more electronic components disposed therein, and may also provide the force or pressure that couples the electronics module to the temple. The portion of the first electrical conductor that extends away from the opening of the electronics module may be directly coupled to the temple (e.g. insert molded into the temple) and may electrically contact a slip ring or other electrical components on the frame. In general, the inventors have found that the larger the portion of the first electrical conductor that extends into the electronics module, the better it may couple the electronics module to the temple (i.e. the module may be less likely to be removed from the temple when not desired, or move inside the temple). In some embodiments, the first distance that the first portion of the first electrical conductor extends into the electronics module may be at least approximately 2 cm. In some embodiments, the second distance that the second portion of the first electrical conductor extends away from the opening may be at least approximately 2 cm.

In some embodiments, in the first device as described above, the first electrical conductor may comprise a single structural element. That is, for instance, the electrical conductor may comprise a single contiguous piece of material (i.e. unlike other electrical connectors such as a pogo pin that may include one or more springs that may expand or contract the conductor so as to maintain an electrical contact between two contact by providing an axial force). Such electrical conductors may be less expensive to manufacture and may be less susceptible to failure (e.g. because the single structural element may not comprise a mechanism that could fail, such as when a pogo pin no longer applies sufficient force to maintain the electrical contact while the temple is rotated). However, embodiments are not so limited, and in some embodiments, in the first device as described above, the first electrical conductor may be generally configured to maintain the first conductive path as the first temple is moved relative to the lens housing. That is, the electrical conductor may comprise a single structure or a plurality of structures so long as it is configured to maintain the conductive path between the lens housing and the temple as the temple is moved relative to the lens housing.

In some embodiments, in the first device as described above, the first device may further comprise a first lens coupled to the lens housing. In some embodiments, the first lens may include a first electrical contact. That is, for instance, the lens may comprise an electro-active lens, such as a dynamic or electro-chromic lens. The first conductive path may be electrically coupled to the first electrical contact. For example, the electronics module may comprise one or more components that may provide power or control signals to the electro-active lens. The first conductive path (which includes the first electrical conductor) may electrically couple the electronic components disposed within the electronics module to the first electrical contact of the electro-active lens. In some embodiments, where the first device further comprises a second electrical conductor coupled to the first temple and a second conductive path is provided from the first temple to the lens housing at least in part by the second electrical conductor, the lens may further include a second electrical contact. The second conductive path may be electrically coupled to the second electrical contact. By providing a second conductive path that is electrically isolated from the first conductive path, embodiments may provide for power and/or control signals to be sent from the electronics module to the electro-active lens.

With reference to FIGS. 1-18, exemplary embodiments of electronic eyewear comprising a first electrical conductor that couples an electronics module and a temple of the eyewear are shown. Provided below is a more detailed description of these figures. These exemplary devices are provided for illustration purposes and are not intended to be limiting.

FIG. 1 shows exemplary eyewear 101 that comprises a first temple 102, a lens housing 103 coupled to the first temple, a lens 104 that is supported by the lens housing 103, and a fastener 105. In general, the temple 102 and the lens housing 103 may comprise any suitable materials such as plastic (e.g. acetate) or a metal. Moreover, the temple 102 and the lens housing 103 may, but need not, comprise the same material. The lens 104 may be an electronic lens, such as a dynamic lens or an electro-chromic lens, and may utilize power and/or control signals received from an electronic component(s) disposed on, or within, the temple 102 or the lens housing 103. As shown, the exemplary eyewear 101 may be designed so to not have an appearance that it comprises any electronic devices (or to minimize the appearance of such electronic components). That is, for instance, to an outside viewer of this exemplary embodiment, the electronics module and the conductive path from the temple to the lens housing are not apparent.

Figure 2:
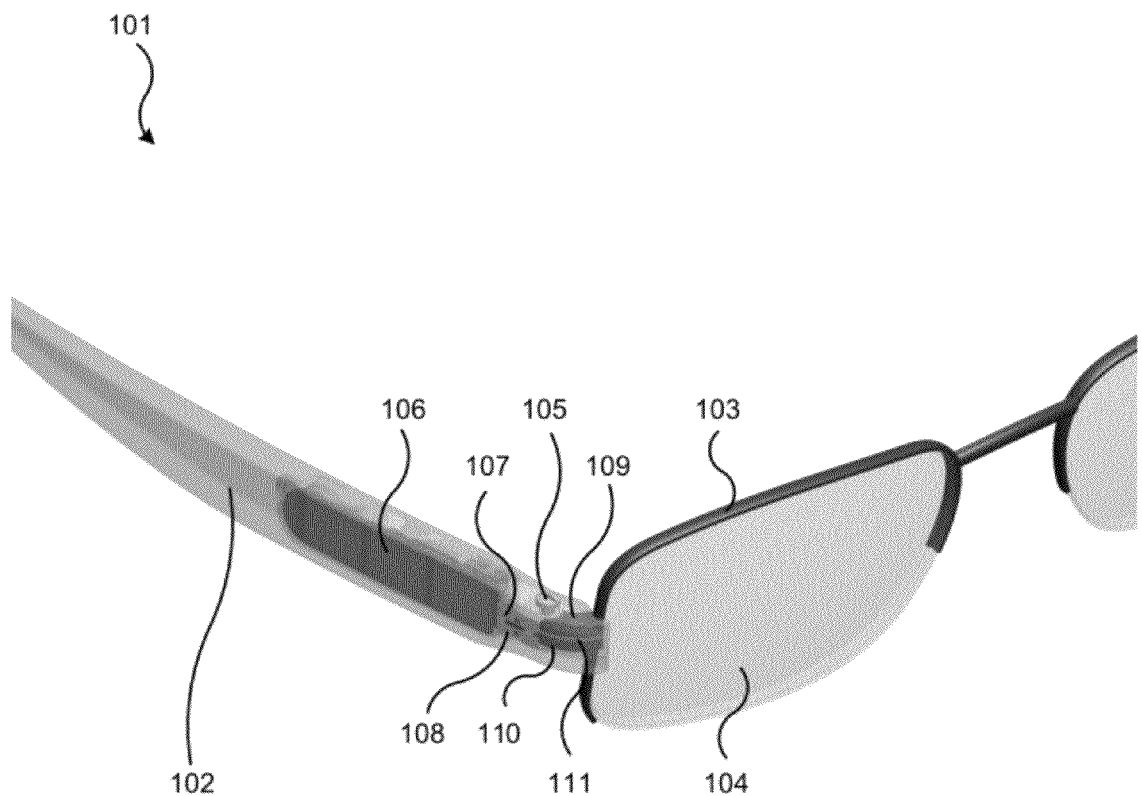
FIG. 2 is an illustration of exemplary electronic eyewear from a front view in accordance with some embodiments. The temple of the eyewear is transparent to show the components disposed therein.

FIG. 2 shows the same exemplary eyewear 101 of FIG. 1, but with a transparent view of the temple 102. As shown, the temple 102 comprises an electronics module 106, which may comprise a plurality of electronic components such as a power source (e.g. a battery), a controller, and/or a sensor. The electronics module 106 is coupled to the temple 102 in part by two electrical conductors: a first electrical conductor 107 and a second electrical conductor 108. As shown in this example, the first 107 and second 108 electrical conductors are each coupled to the temple 102 (and in this case, are shown as being disposed within a portion of the temple 102). The fastener 105 is shown in this example as being adapted to compress or hold the first 107 and second 108 electrical conductors in electrical contact with a first conductive path 109 and a second 110 conductive path, respectively. For instance, when the fastener 105 is tightened, it applies a force to a portion of each of the electrical conductors 107 and 108, as well as the material comprising a portion of the conductive paths 109 and 110, thereby moving each of these components into electrical contact (or maintaining the electrical contact) based on the threading of the fastener 105. An insulator material 111 is shown as being disposed between the first 109 and the second 110 conductive paths so as to electrically isolate the paths. In general, the conductive paths 109 and 110 may comprise any suitable conductive material or materials, and may in some instances comprise electrical components, connectors, and/or portions of a hinge. The first 109 and second 110 conductive paths are shown in this example as connecting to the lens housing 103, where the conductive paths may further electrically connect to one or more electrical contacts of an electro-active lens 104 or perhaps to electronic devices disposed on the lens housing 103 or on the other temple of the eyewear 101.

Figure 3:
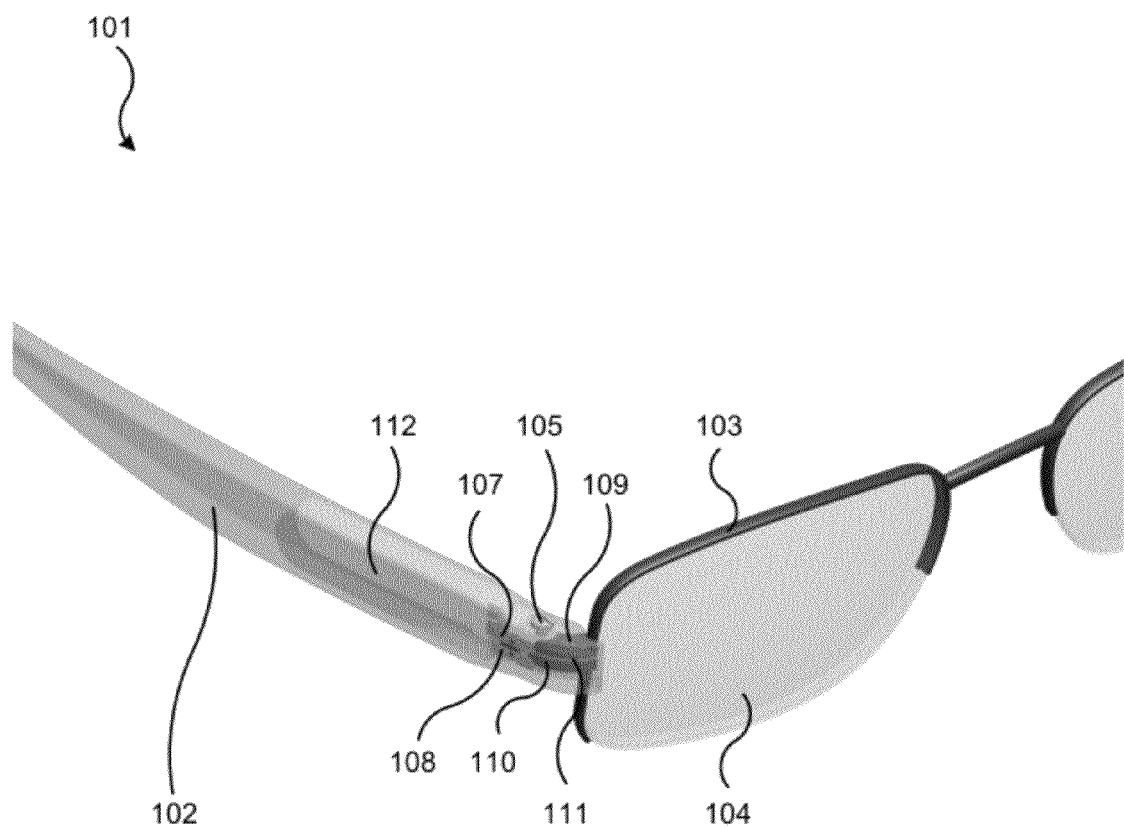
FIG. 3 is an illustration of exemplary electronic eyewear from a front view in accordance with some embodiments. The temple of the eyewear is transparent to show the components disposed therein.

FIG. 3 illustrates the same exemplary electronic eyewear described above, except that the electronics module 106 has been removed from a cavity 112 of the first temple 102. This may correspond to a step in the manufacturing process of the eyewear 101 (e.g. prior to disposing the electronics module 106 within the temple 102), or perhaps corresponds to a situation in which a wearer may have removed the electronics module 106 to repair or replace the module. As shown below in FIGS. 4-9 and described in more detail, the first 107 and second 108 electrical conductors may have a first portion disposed in the cavity 112 as well as a second portion that is not disposed within the cavity 112 (e.g. the second portion may be embedded or directly coupled to the temple 102). FIG. 3 also shows the first 109 and second 110 conductive paths from the temple 102 to the lens housing 103, where one or both of the conductive paths may electrically connect (via a conductor disposed on or within the lens housing 103, or through the lens housing 103 itself for embodiments where it comprises a conductive material) to the lens 104 or other electronic components not shown.

Figure 4:
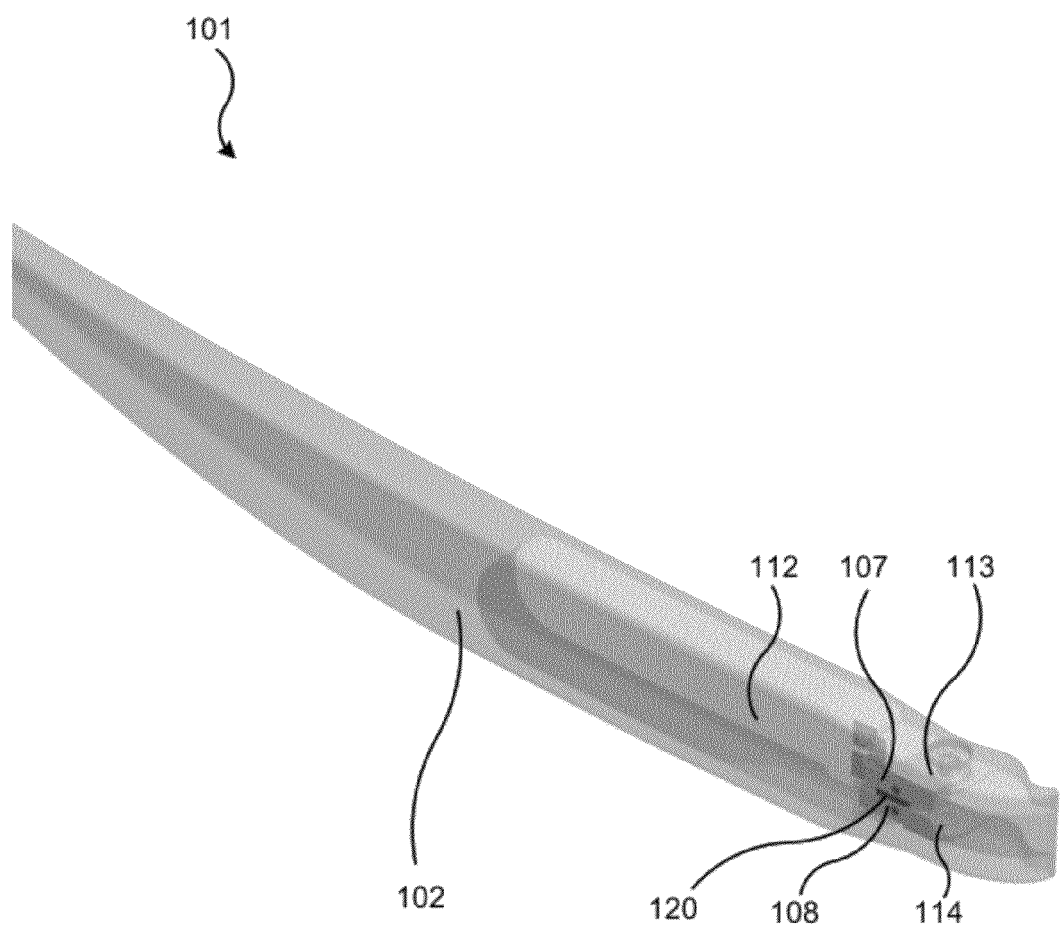
FIG. 4 is an illustration of the temple of exemplary electronic eyewear in accordance with some embodiments. The temple of the eyewear is transparent to show the components disposed therein.

FIG. 4 is a close-up view of the temple 102 of the exemplary eyewear 101. As shown, the first electrical conductor 107 and the second electrical conductor 108 may be disposed within the temple 102 (e.g. couple to the temple 102). In the exemplary embodiment shown in FIG. 4, the first 107 and second 108 electrical conductors may each have a portion (portions 112 and 114, respectively) that forms an electrical contact with the first 109 and second 110 conductive paths (not shown). In this example embodiment, the electrical contacts 113 and 114 are shown as having an opening in which the fastener 105 may be inserted so as to apply a force to each of the electrical conductors 107 and 108. To maintain electrical isolation between the first 107 and second 108 conductors while this force (and any other force that may result during the use of the eyewear), an insulator 120 may be coupled to each of the conductors 107 and 108 and/or disposed there between.

Figure 5:
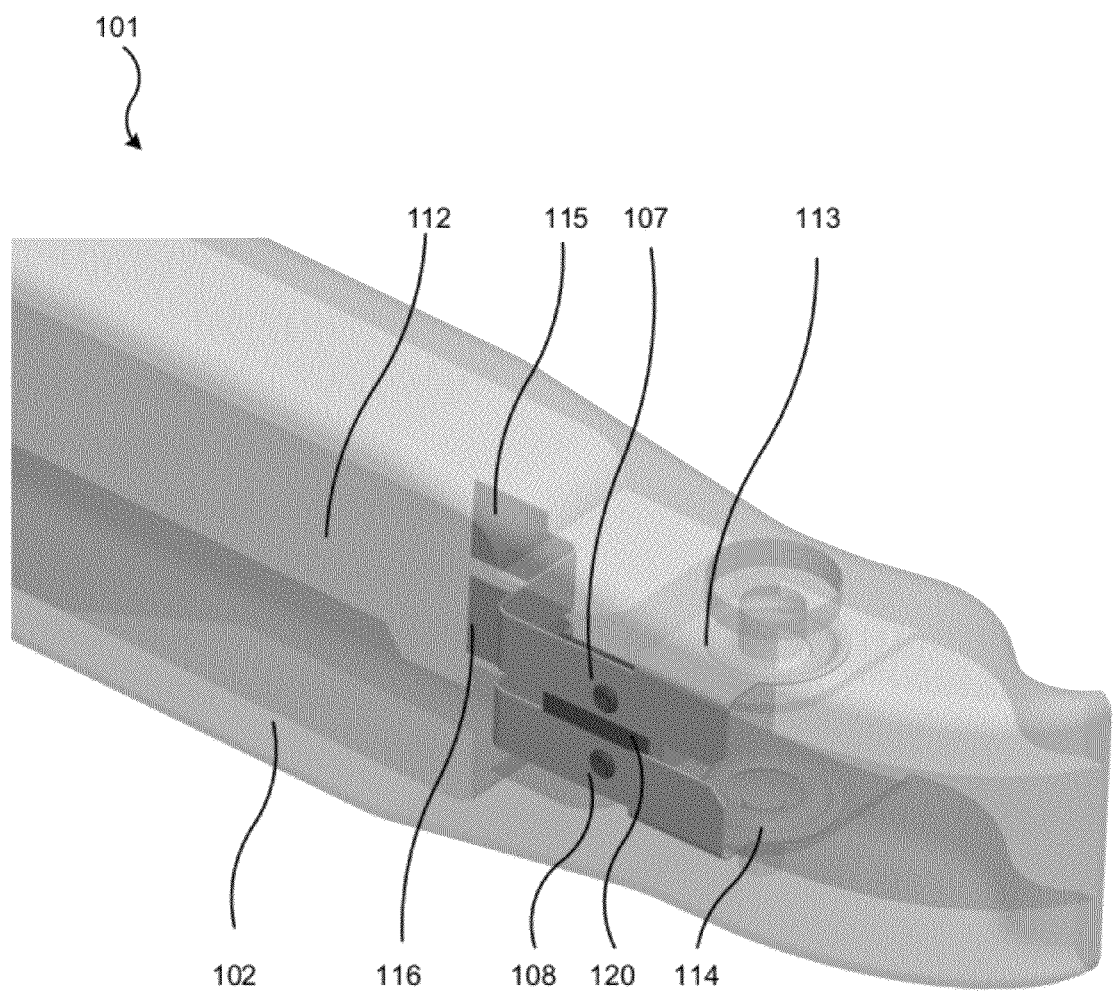
FIG. 5 is close-up illustration of the first and second electrical conductors coupled to the temple of the exemplary electronic eyewear in accordance with some embodiments. The outer side of the temple (i.e. the portion of the temple that faces away from the wearer when the eyewear is worn) is shown, but the temple of the eyewear is transparent to show the components disposed therein.

FIG. 5 is a close-up of the components shown in a section of the exemplary embodiment shown in FIG. 4. As can be seen in FIG. 5, the first 107 and second 108 electrical conductors may also have portions (115 and 116) that extend into the cavity 112 of the temple 102 of the eyewear 101. Each of the portions 115 and 116 may be configured to form an electrical contact with one or more electrical components disposed within the cavity 112, as well as to couple the electronic components (or an electronics module that may comprise a plurality of electronic components) to the temple 102. In this manner, electronic components may be readily coupled and/or decoupled to the temple 102. Moreover, as described above, embodiments may provide more robust electrical connections because of the force and electrical connections applied and created by the portions 115 and 116 of the conductors 107 and 108 to the electrical contacts of the electronic components. Moreover, coupling the electrical conductors that form the electrical connections with the components in the cavity 112 may, in some instances, eliminate the need to include electrical connectors that extend out of an electronics module, which may be more susceptible to damage when, for instance, the module is being transported outside the frame. That is, for instance, the electrical conductors 107 and 108 may be at least partially protected by the temple 102, even when no electronic components are disposed in the cavity 112. In addition, it may also be more difficult to fixedly (i.e. permanently) couple such electrical connectors to the components disposed within an electronics module, as this may require, for example, hand soldering the components through a relatively small opening of the electronics module. In contrast, utilizing electrical conductors (e.g. conductors 107 and 108) that are coupled to the temple 102 (and thereby need not necessarily be soldered or permanently coupled to the components disposed within an electronics module) may reduce the complexity, expense, and/or the chance of error or damage to the electronic components during this manufacturing process.

Figure 6:
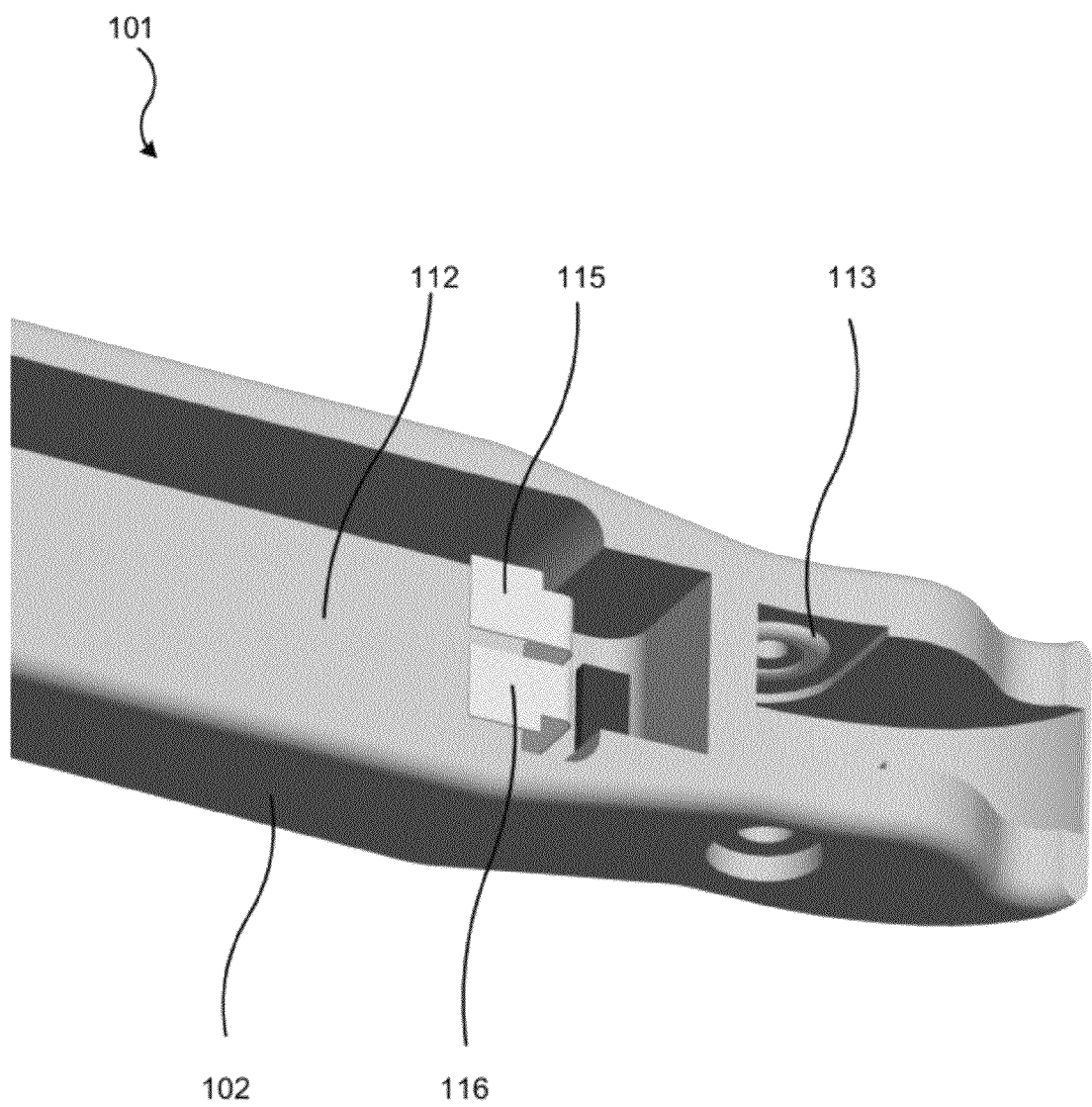
FIG. 6 is a close-up illustration of a portion of the temple of the exemplary electronic eyewear in accordance with some embodiments. The inner side of the temple (i.e. the portion of the temple that faces the wearer when the eyewear is worn) is shown as having a cavity with a portion of the first and second electrical conductors disposed therein.

FIG. 6 shows a view of the inside surface (i.e. the surface that faces a wearer when the eyewear 101 is worn) of a portion of the temple 102 of the exemplary eyewear 101. This view better illustrates the portions 115 and 116 of the electrical conductors 107 and 108, respectively, which extend into the cavity 112. As illustrated, the exemplary portions 115 and 116 are shown as elevated or raised above the inside surface of the cavity 112. This may enable these portions of the electrical conductors to be inserted into an opening of an electronics module and apply a force that restrains the module in the cavity (i.e. holds the module in place and prevents the module from moving, particularly in a direction directly away from the frames). In some embodiments, the module may still be removable from the cavity 112 of the temple 102, but this may require a force to be applied that may not be typical of those experienced during daily use (e.g. the module may need to be pulled away from the portions of the conductors 115 and 116 in a direction substantially parallel to the temple 102) and/or require the removal of one or more fasteners that may also be coupled to the electronics module).

Figure 7:
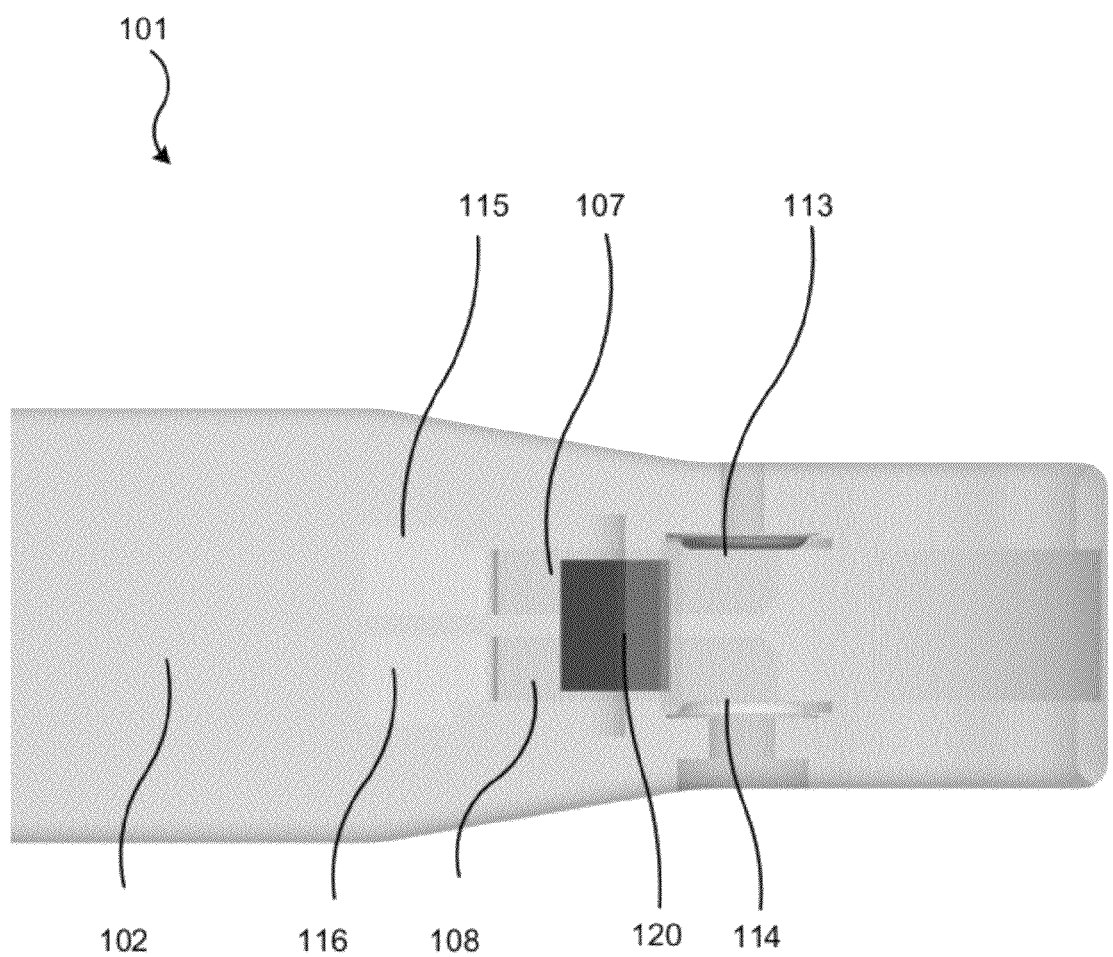
FIG. 7 is a close-up illustration of a side-view of a portion of the temple of the exemplary electronic eyewear in accordance with some embodiments. The temple is shown as being transparent to illustrate the electrical conductors disposed within the temple.
Figure 8:
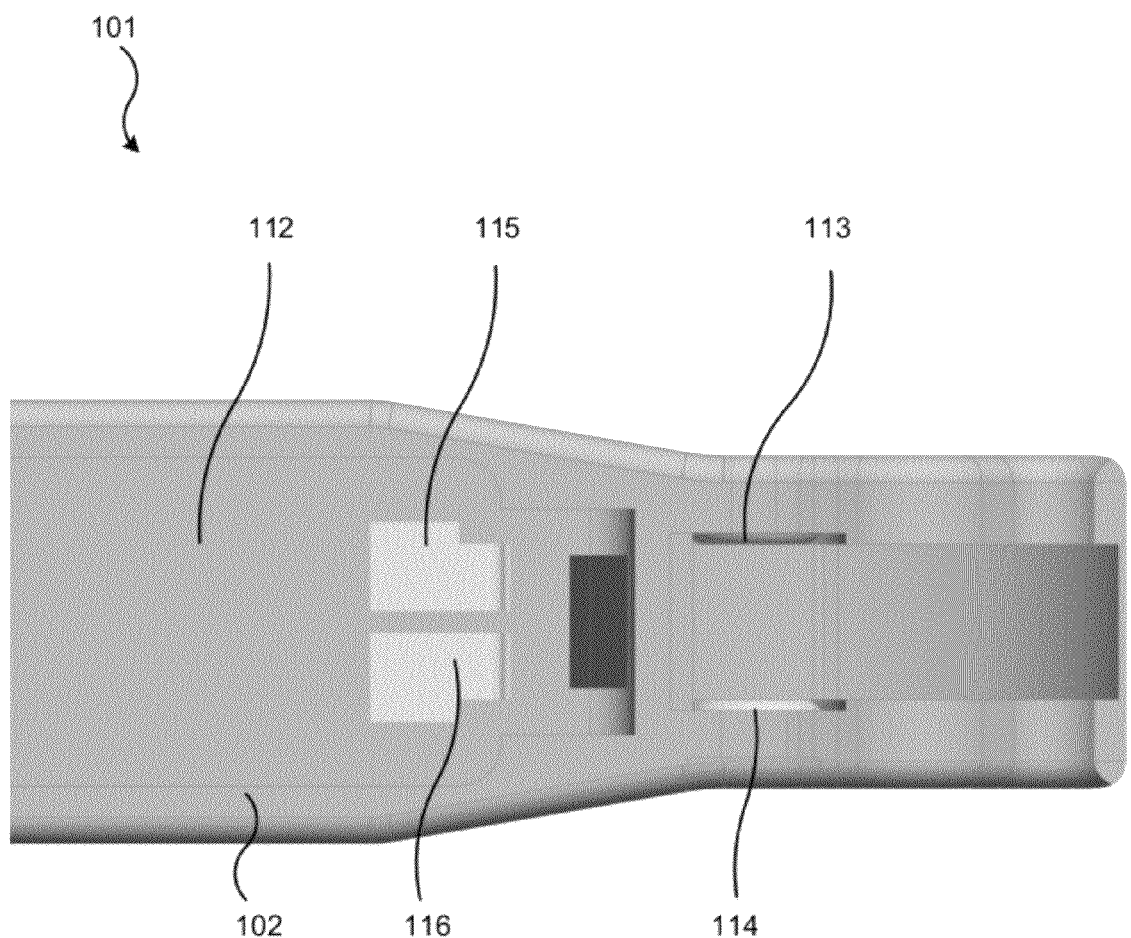
FIG. 8 is a close-up illustration of a side-view of a portion of the temple of the exemplary electronic eyewear in accordance with some embodiments. The inner side of the temple (i.e. the portion of the temple that faces the wearer when the eyewear is worn) is shown as having a cavity with a portion of the first and second electrical conductors disposed therein.

FIG. 7 shows a similar side view of the exemplary eyewear 101 as in FIG. 6; however, FIG. 7 shows the portions of the electrical conductors 107 and 108 that are encapsulated or disposed within the temple 102 (i.e. the temple 102 is transparent). As shown, the electrical insulator 120 that is coupled to the electrical conductors 107 and 108 so as to maintain electrically isolation may also be disposed within the temple 102. In addition, the portions of the electrical conductors 113 and 114 (in this case comprising an opening to allow a fastener to be inserted thereto and apply a tightening force) are also shown as being disposed within the temple 102 (and thereby an outside observer may not be able to perceive these components). In this regard, FIG. 8 shows the same side view of the exemplary eyewear 101 as in FIG. 7, except that the temple 102 is solid (rather than transparent). As can be seen, in this exemplary embodiment only the portions 115 and 116 of the electrical conductors 107 and 108 may be exposed to the external environment (although portions 113 and 114 appear to be exposed, in some embodiments, these portions may be in electrical contact with the conductive paths 109 and 110 (not shown) and/or encapsulated in the temple 102 and/or hinge as well. The other portions of the electrical conductors 107 and 108 may thereby be isolated from the external environment, thereby reducing the likelihood of damage or short circuits forming.

Figure 9:
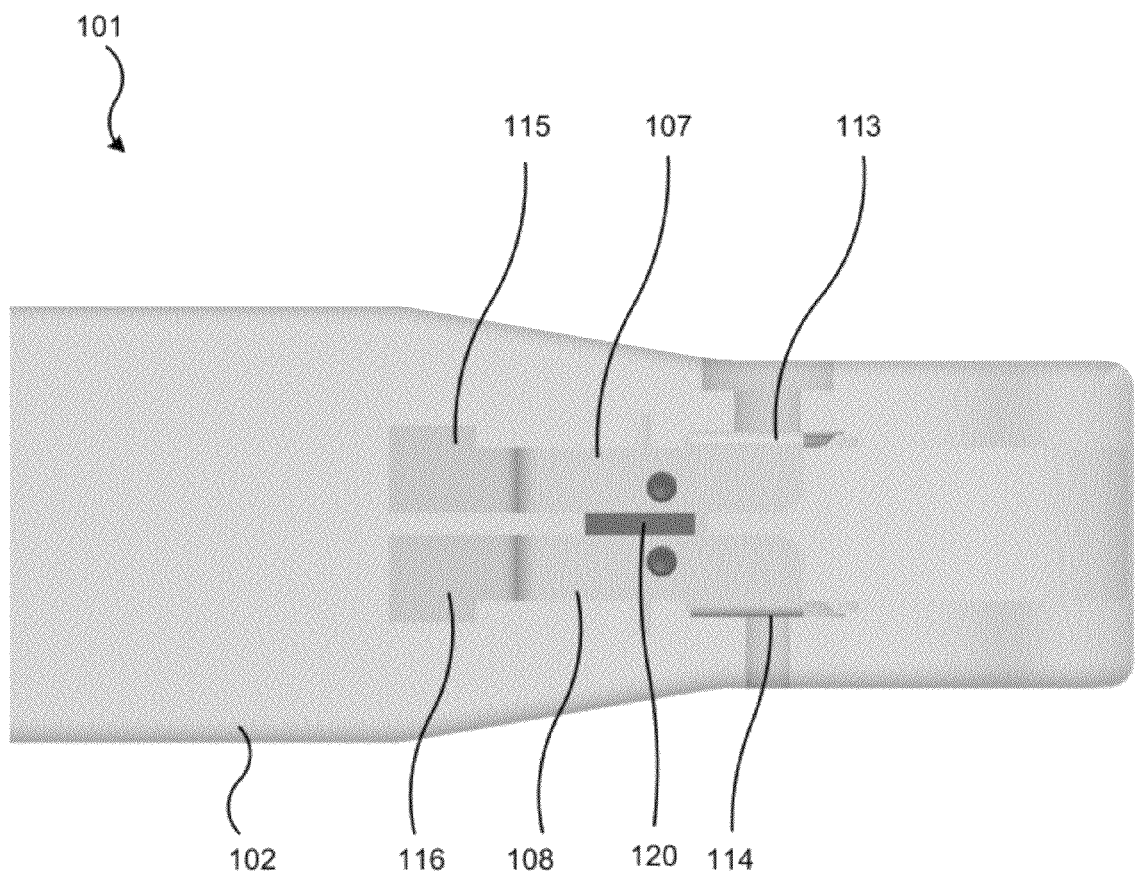
FIG. 9 is a close-up illustration of a side-view of a portion of the temple of the exemplary electronic eyewear in accordance with some embodiments. The outer side of the temple (i.e. the portion of the temple that faces away from the wearer when the eyewear is worn) is shown, but the temple is transparent to illustrate the electrical conductors disposed therein.

FIG. 9 shows a view from the outside surface (i.e. the surface that faces away from wearer when the eyewear 101 is worn) of a portion of the temple 102 of the exemplary eyewear 101. This view illustrates the portions 115 and 116 of the electrical conductors 107 and 108, respectively, which extend into the cavity 112. As illustrated, the exemplary portions 115 and 116 are shown as elevated or raised above the inside surface of the cavity 112. Moreover, as shown in this example, the insulator 120 may be disposed and coupled to one side of the electrical conductors 107 and 108; however, embodiments are not so limited.

Figure 10:
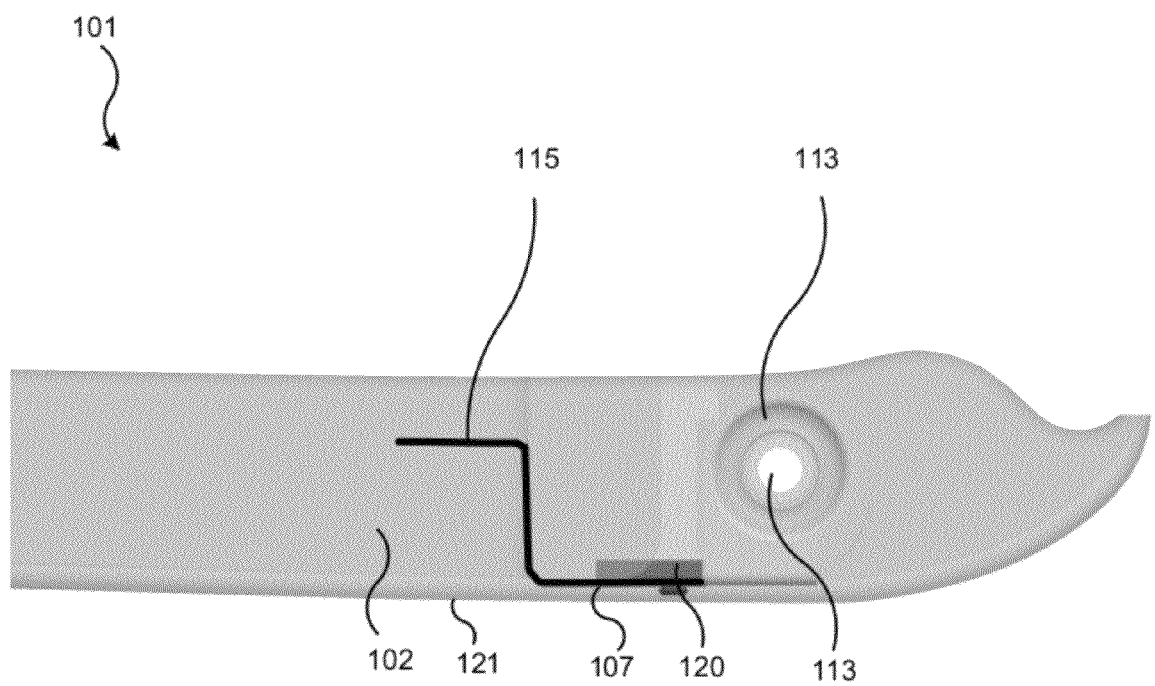
FIG. 10 is a close-up illustration of a top-view of a portion of the temple of the exemplary electronic eyewear in accordance with some embodiments. The temple is transparent to illustrate the electrical conductors disposed therein.

FIG. 10 shows a top-view of a portion of the temple 102 of the exemplary eyewear 101. As shown in this example, the electrical conductor 107 may have different portions that extend in different directions relative to, for instance, a surface of the temple 102 (e.g. the outer surface 121). As shown, a portion of the electrical conductor may extend parallel to the surface 121, then extend perpendicular to the surface 121 (e.g. while still disposed within the temple 102), and then the portion 115 may extend parallel to the surface 121 as it enters the cavity 112 of the temple 102. In this manner, the electrical conductor 107 may provide sufficient support to adequately couple the electronic components (and/or electronics module) to the temple 102. Also as shown in FIG. 10, in this exemplary embodiment, the portion 113 of the electrical conductor 107 comprises an opening 119 in which a fastener 105 (not shown) may be inserted and utilized to couple the electrical conductors 107 and 108 to the first 109 and second 110 conductive paths, respectively, in the other portions of the temple 102. However, embodiments are not so limited and any suitable manner of making and maintaining these electrical connections may be used.

Figure 11:
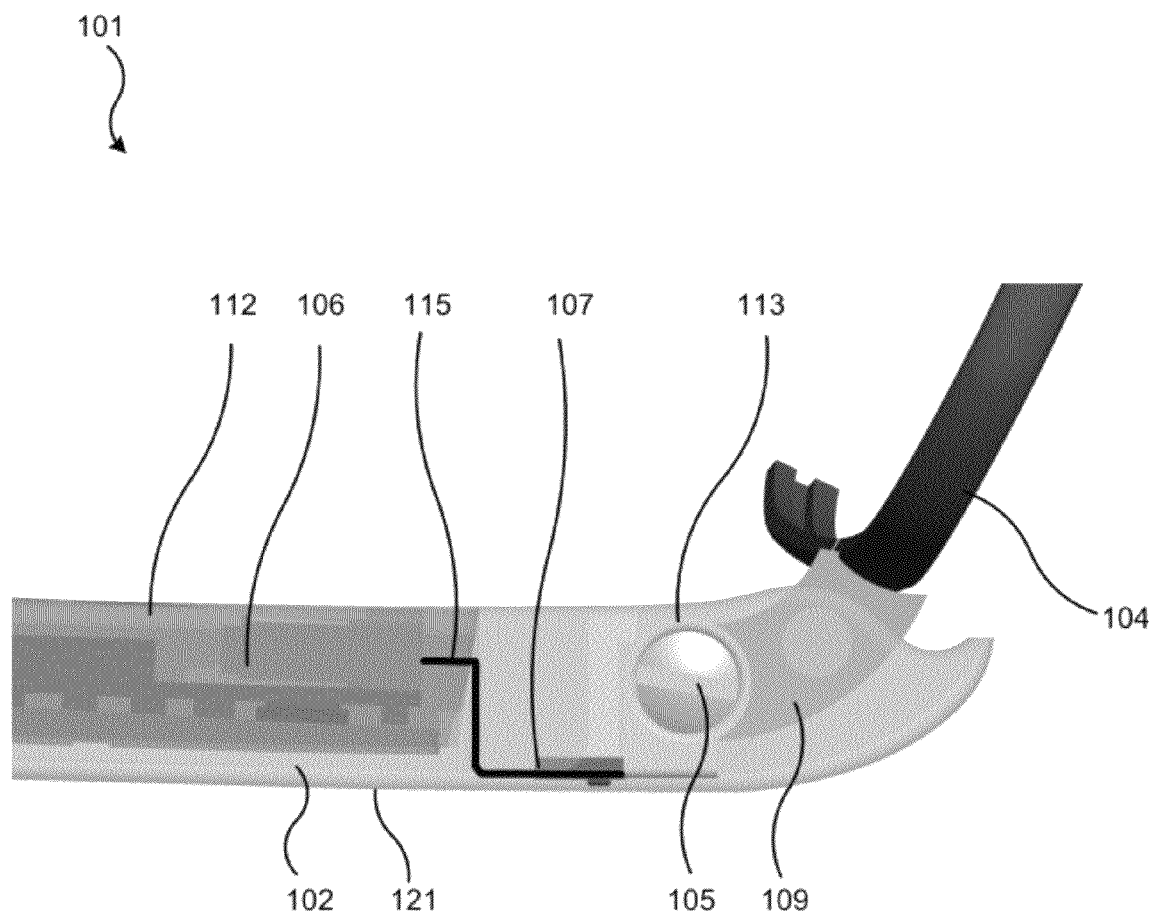
FIG. 11 is a close-up illustration of a top-view of a portion of the temple of the exemplary electronic eyewear in accordance with some embodiments. The temple is transparent to illustrate the electrical components disposed therein.

FIG. 11 shows the same top-view of the portion of the temple 102 of the exemplary eyewear 101 as shown in FIG. 10, except that additional components are now shown. In particular, FIG. 10 shows the fastener 105 inserted in the opening 119 of the portion 113 of the electrical conductor 107. FIG. 10 also shows the first conductive path 109 coupled to the lens housing 104, where the fastener 105 is utilized to maintain the electrical contact between the conductive path 109 and the portion 113 of the electrical conductor 107. In addition, FIG. 10 also shows an electronics module 106 disposed in the cavity 112 of the temple 102. The portion 115 of the electrical conductor 107 is shown as disposed within a portion of the electronics module 106. As shown, the shape of the electrical conductor 107 such that it comprises a portion 115 that enters parallel with the outside surface 121 of the temple 102 may enable, in this exemplary embodiment, the portion 115 of the electrical conductor 107 to couple the electronics module 106 to the first temple 102 (e.g. it may provide a restraining force such that the electronics module 106 may be held in substantially place within the cavity 112). However, embodiments are not so limited and any suitable shape or disposition of the electrical conductor 107 such that it couples the electronics module 106 and/or the components therein to the temple 102 may be utilized in accordance with some embodiments.

Figure 12:
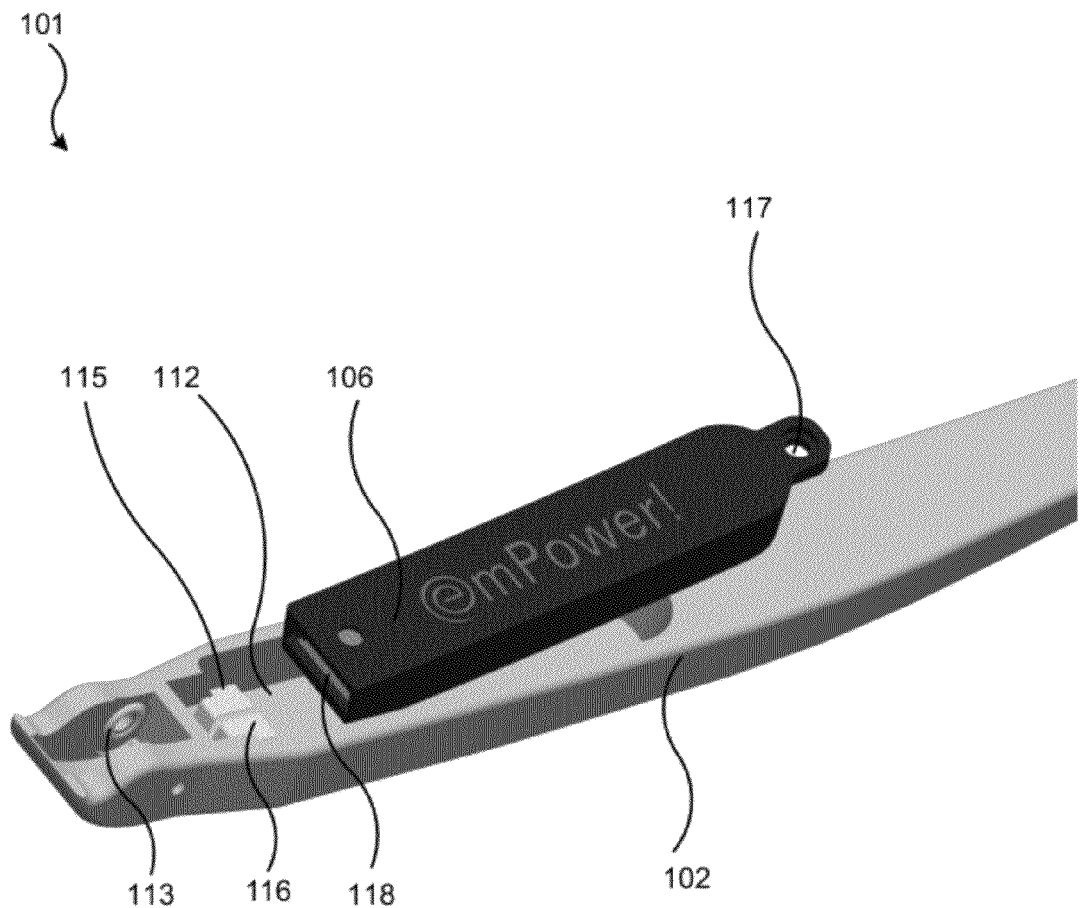
FIG. 12 is a close-up illustration of a side-view of a portion of the temple of the exemplary electronic eyewear in accordance with some embodiments. The inner side of the temple (i.e. the portion of the temple that faces the wearer when the eyewear is worn) is shown as having a cavity with a portion of the first and second electrical conductors disposed therein. An exemplary electronics module is shown as being inserted within the cavity.

FIG. 12 shows a view of the inside surface (i.e. the surface that faces a wearer when the eyewear 101 is worn) of a portion of the temple 102 of the exemplary eyewear 101. In particular, FIG. 12 illustrates the insertion of an electronics module 106 that may comprise a plurality of electronic components in the cavity 112 of the temple 102. As shown, the electronics module 106 may comprise an opening 118 that may enable the portions 115 and 116 of the electrical conductors 107 and 108, respectively, to be disposed into the electronics module 106 so as to (1) form one or more electrical connections with the electronic components disposed therein and/or (2) couple the electronics module 106 to the temple 102. As illustrated, the exemplary portions 115 and 116 are shown as elevated or raised above the inside surface of the cavity 112. This may enable these portions of the electrical conductors to be inserted into the opening 118 of the electronics module 106 and apply a force that restrains the electronics module 106 in the cavity 112 (i.e. holds the module in place and prevents the module from moving, particularly in a direction directly away from the frames). In some embodiments, the electronics module 106 may still be removable from the cavity 112 of the temple 102, but this may require a force to be applied that may not be typical of those experienced during daily use (e.g. the module may need to be pulled away from the portions of the conductors 115 and 116 in a direction substantially parallel to the length of the temple 102) and/or require the removal of one or more fasteners that may also be coupled to the electronics module 106). In this regard, the exemplary electronics module 106 shown in FIG. 12 includes a portion 117 comprising an opening in which a fastener may be inserted through to couple the one side of the electronics module 106 (i.e. the side opposite the one coupled by the portions 115 and 116 of the electrical conductors 107 and 108) to the temple 102.

Figure 13:
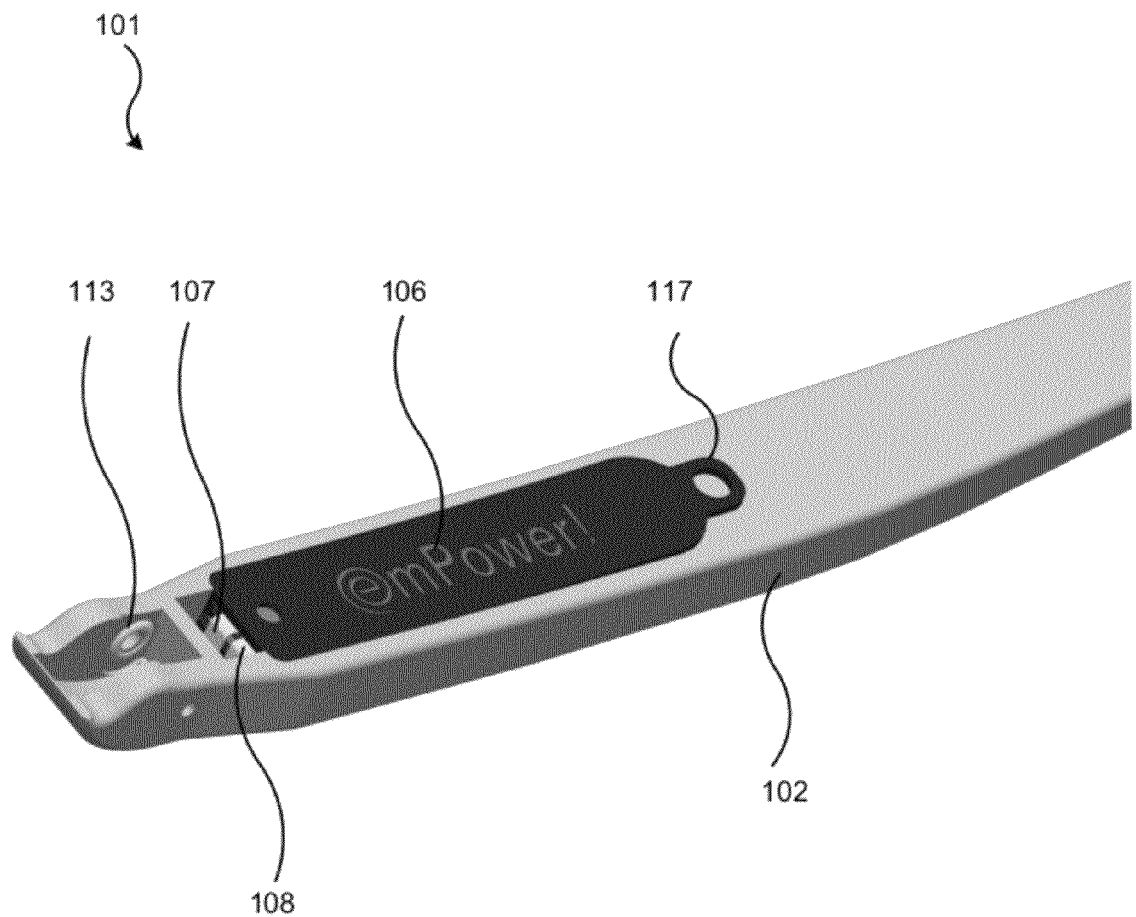
FIG. 13 is a close-up illustration of a side-view of a portion of the temple of the exemplary electronic eyewear in accordance with some embodiments. The exemplary electronics module is shown as being disposed within a portion of the temple.
Figure 14:
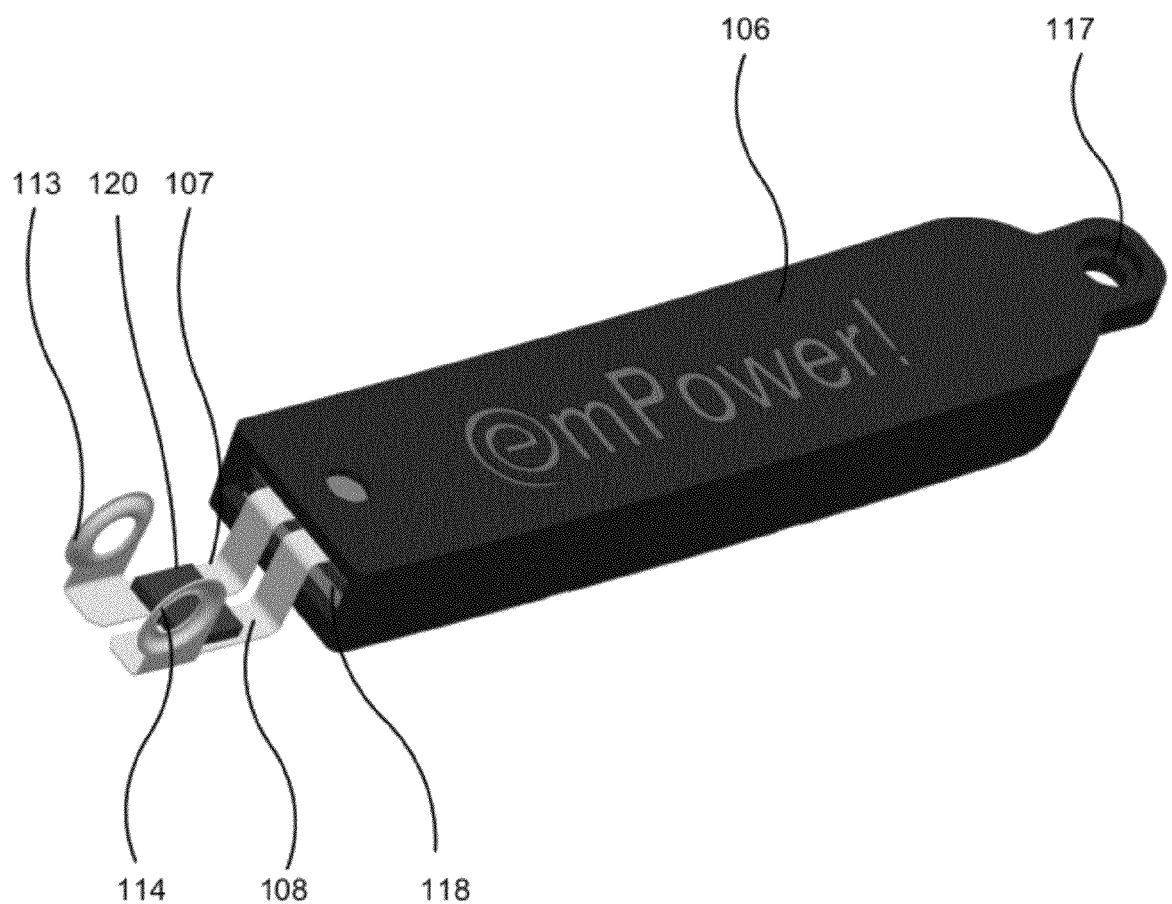
FIG. 14 is an illustration an exemplary electronics module coupled to the electrical conductors in accordance with some embodiments.

FIG. 13 shows the exemplary device shown in FIG. 12 after the electronics module 106 has been disposed into the cavity 112 and coupled to the temple 102 by the portions 115 and 116 of the electrical conductors 107 and 108, respectively. As shown, the portions 115 and 116 of the electrical conductors 107 and 108, respectively, are disposed through the opening 118 of the electronics module 106 so as to (1) form one or more electrical connections with the electronic components disposed therein and/or (2) couple the electronics module 106 to the temple 102. In addition, the portion 117 comprises an opening through which a fastener (not shown) is inserted through to hold the side of the exemplary electronics module 106 (i.e. the side opposite the one coupled by the portions 115 and 116 of the electrical conductors 107 and 108) in place.

FIG. 13 shows an exemplary electronics module 106 and the manner in which it may be coupled by the electrical conductors 107 and 108 (and thereby to the temple 102 of the exemplary eyewear 101). For illustration purposes, the temple 102 and other components have been removed from the figure. As shown, the portions 115 and 116 (not shown because they are disposed within the electronics module 106) of the electrical conductors 107 and 108 are disposed through the opening 118 of the electronics module 106. The portions 113 and 114 may be disposed in the temple 102 and may form an electrical contact with one or more conductive paths 109 and 110, respectively, which may be maintained by the force applied by a fastener 105 through the opening in portions 113 and 114. In addition, to maintain electrical isolation of the two electrical conductors, the insulating material 120 may be coupled to, and/or disposed between, the conductors. The electronics module 106 may also have a portion 117 that may be separately coupled to the temple 102 by a fastener, or any other suitable means.

Figure 15:
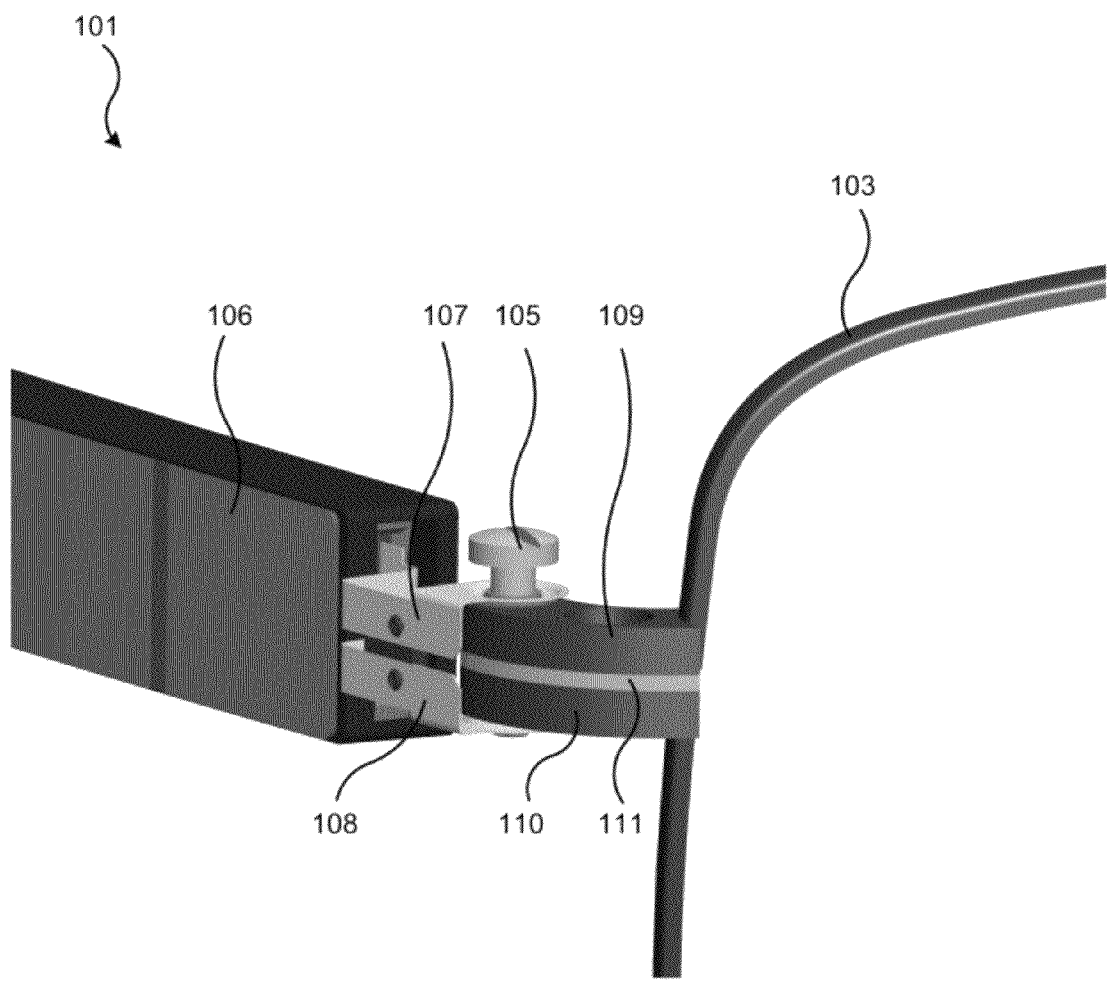
FIG. 15 is an illustration of the components of the exemplary eyewear as they may be disposed within the temple of the eyewear in accordance with some embodiments.

FIG. 15 illustrates the exemplary electronic eyewear 101 as described above, except that temple has been removed 102 for illustration purposes. As shown, an electronics module 106 (which may comprise a plurality of electronic components such as a power source—e.g. a battery-, a controller, and/or a sensor) may be coupled to the temple 102 (not shown) in part by the first electrical conductor 107 and the second electrical conductor 108. As shown in this example, the first 107 and second 108 electrical conductors are each held in electrical contact with the first conductive path 109 and the second conductive path 110, respectively, by the fastener 105. For instance, when the fastener 105 is tightened, it applies a force to a portion of each of the electrical conductors 107 and 108, as well as the material comprising a portion of the conductive paths 109 and 110, thereby moving each of these components into electrical contact (or maintaining the electrical contact) based on the threading of the fastener 105. An insulator material 111 is shown as being disposed between the first 109 and the second 110 conductive paths so as to electrically isolate the paths. The first 109 and second 110 conductive paths are shown in this example as connecting to the lens housing 103, where the conductive paths may further electrically connect to one or more electrical contacts of an electro-active lens 104 or perhaps to electronic devices disposed on the lens housing 103 or on the other temple of the eyewear 101.

Figure 16:
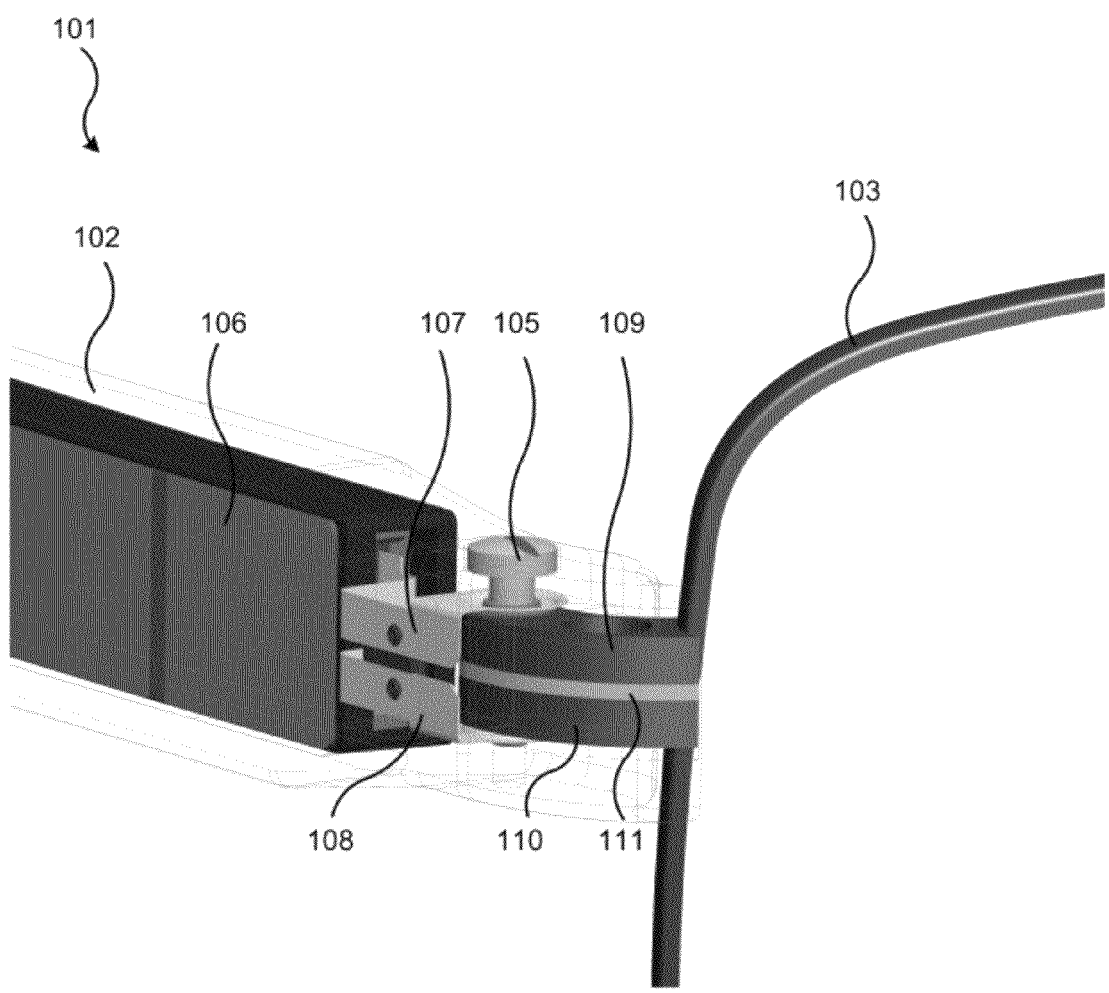
FIG. 16 is an illustration of the components of the exemplary eyewear as they may be disposed within the temple of the eyewear in accordance with some embodiments.

FIG. 16 shows the same exemplary embodiment of eyewear 101 shown in FIG. 15, except that the structure of the temple 102 has been added as a wire frame to further illustrate how each of these exemplary components may be disposed within (or not disposed within) the structure of the temple 102. In this regard, when the electronics module 106 is disposed within the cavity 112 of the temple 102, the conductive paths and electronic components may have a minimum amount of exposure to the external environment, thereby potentially decreasing damage and shorting that could occur.

Figure 17:
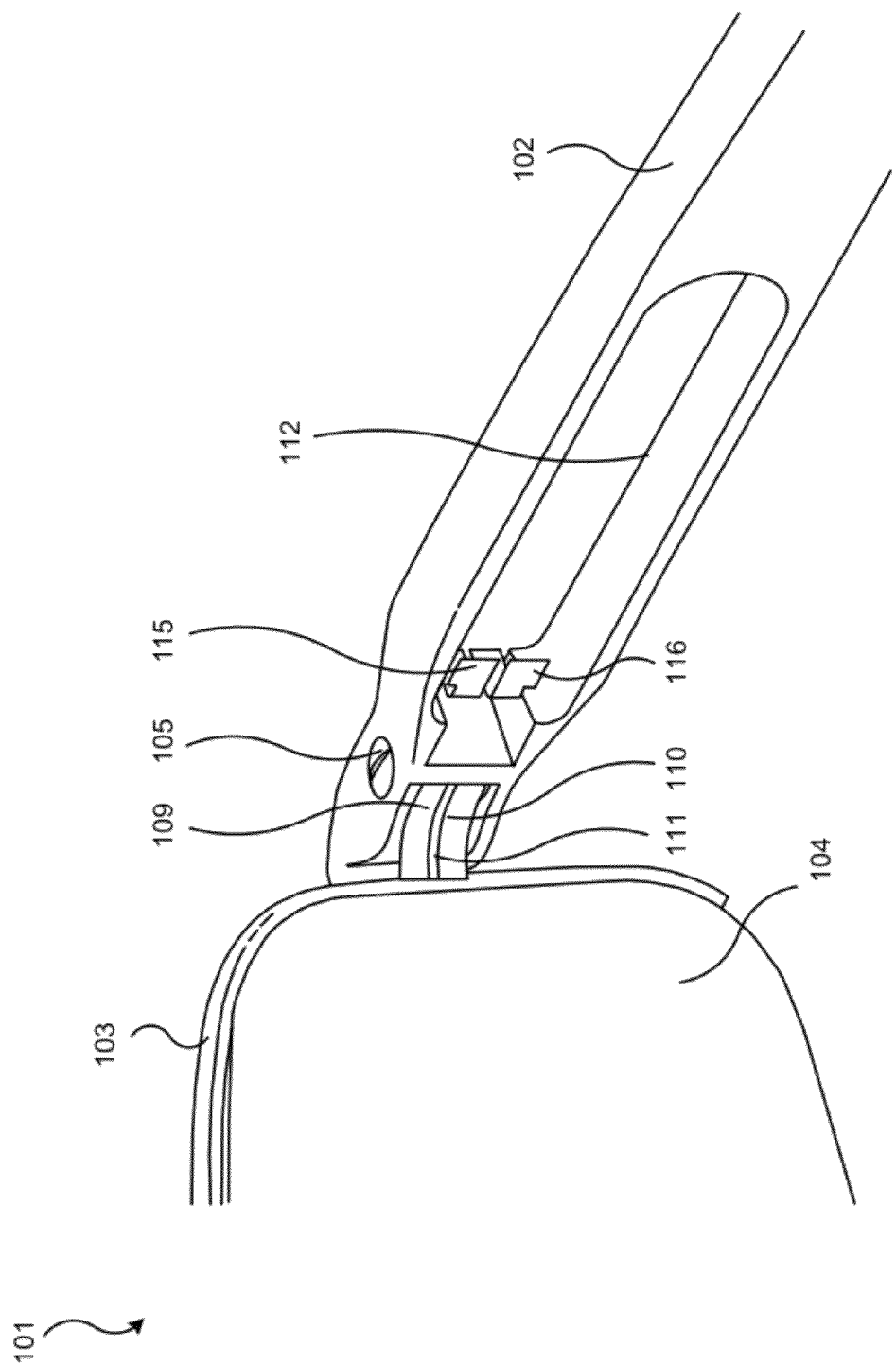
FIG. 17 is an illustration of a portion of the temple of the exemplary electronic eyewear in accordance with some embodiments. The inner side of the temple (i.e. the portion of the temple that faces the wearer when the eyewear is worn) is shown as having a cavity with a portion of the first and second electrical conductors disposed therein.

FIG. 17 shows the same exemplary eyewear 101 and, in particular, is a back-side view of the inside surface of the temple 102. As shown, the temple a cavity 112 in which one or more electronic components (or an electronics module 106, which may comprise a plurality of electronic components such as a power source (e.g. a battery), a controller, and/or a sensor) may be disposed therein. The first electrical conductor 107 and a second electrical conductor 108 are shown as having portions 115 and 116 disposed within the cavity 112. The first 107 and second 108 electrical conductors are each coupled to the temple 102 (and in this case, they are disposed within a portion of the temple 102). The fastener 105 is shown in this example as being adapted to compress or hold the first 107 and second 108 electrical conductors in electrical contact with a first conductive path 109 and a second 110 conductive path, respectively. For instance, when the fastener 105 is tightened, it applies a force to a portion of each of the electrical conductors 107 and 108, as well as the material comprising a portion of the conductive paths 109 and 110, thereby moving each of these components into electrical contact (or maintaining the electrical contact) based on the threading of the fastener 105. An insulator material 111 is shown as being disposed between the first 109 and the second 110 conductive paths so as to electrically isolate the paths. In general, the conductive paths 109 and 110 may comprise any suitable conductive material or materials, and may in some instances comprise electrical components, connectors, and/or portions of a hinge. The first 109 and second 110 conductive paths are shown in this example as connecting to the lens housing 103, where the conductive paths may further electrically connect to one or more electrical contacts of an electro-active lens 104 or perhaps to electronic devices disposed on the lens housing 103 or on the other temple of the eyewear 101.

FIGS. 18(*a*)-(*c*) show further examples of electrical conductors coupling one or more electronic components and/or an electronics module to the first temple of exemplary eyewear. With reference to FIG. 18(*a*), the exemplary device shown therein comprises electrical conductors 107 and 108 that are coupled to the electronic component 125, which is disposed within a cavity of the temple 102. The electronic component 125 may be coupled to the one or more other electronic components (e.g. through a printed circuit board, electrical connectors, or physical connections such as fasteners, adhesives, or soldering) that may also be disposed in the temple 102, such as power source 126. Thus, as shown, in some embodiments an electronics module need not be included, and the electrical conductors 107 and 108 may effectively couple the electronic components to the temple

102. FIGS. 18(*b*) and 18(*c*) illustrate an embodiment in which an electronics module 106 may be included and disposed in a cavity of the temple 102.

As shown in FIG. 18(*b*), the conductors 107 and 108 may couple the electronics module 106 to the temple 102 by being disposed within an opening of the electronics module 106. As shown in FIG. 18(*c*), the electronics module 106 may comprise electronic components (e.g. component 125) similar to the embodiment shown in FIG. 18(*a*). The conductors 107 and 108 may couple to the same electronic component 125 (which is disposed within the electronics module), and thereby apply a force to maintain the electronics module 106 in place. The fastener 105 may be configured to maintain the electrical connection between the conductors (107 and 108) and the first 109 and second 110 conductive paths, which may be further electrically coupled to the lens housing 103.

Capacitive Touch Switch Embodiments

In general, the manufacture of electronics module that may be used, for instance, to contain, transport, and/or couple a plurality of electronic components to the frames of electronic eyewear may be difficult and potentially expensive and time consuming. Often times the electronic components are disposed within the electronics module by hand because, for instance, the amount of space within the electronics module is relatively small. In addition, this limited work area within the module tends to make it extremely difficult to form the electrical connections between the electronic components while they are disposed within the module (the electrical connections are also generally established manually—e.g. through hand soldering the electrical connections), and typically result in shorts across electrical connections. This may lead to a large number of components having to be discarded during the manufacturing process or additional time must be spent attempting to disconnect the erroneous electrical connections.

The inventors have discovered a method of manufacturing that may enable more efficient and timely production of such electronics module, particularly those that may comprise a sensor such as a captive touch switch. In particular, the inventors have found that by utilizing a substrate (such as a surface of a touch sensor; preferably a capacitive touch switch) as a "back bone" (e.g. a platform) on which other electronic components may be disposed on, the electronic components may be more readily physically coupled together prior to being inserted into the more confining electronics module enclosure. The easier coupling may be due to the fact that the substrate (e.g. capacitive touch switch) on which the components are first disposed may only cover a small portion of the electronic components (e.g. potentially one side of the components), while allowing access to all of the other portions of the electronic components. Moreover, the electrical connections between the components may also be more readily established because this manufacturing process may no longer require that the soldering (or any other technique to form electrical connections) is performed while the electrical components are disposed within the confining electronics module (i.e. in a small workspace).

For example, each of the electronic components (such as a power source, controller, electrical connectors, etc.) may be disposed or coupled to a capacitive touch switch (e.g. through any suitable technique, including reflow soldering). The electrical connections between each of the electrical components may then be established (e.g. by soldering). The entire electronic assembly (comprising the capacitive touch switch (as the platform) and the electronic components disposed thereon) may then be disposed within the outer casing of an electronics module (or in some embodiments, directly into a cavity of a temple of electronic eyewear). The capacitive touch switch may serve as the top surface of the electronics module, and may be coupled thereto in any suitable way (such as being molded or pressure fitted to the outer casing). In this way, the electrical connections need not be established while the electronic components are disposed in the module, thereby increasing efficiency and potentially allowing for automation of some or all of the process.

In general, the inventors have found that in some embodiments, any surface or substrate may be utilized to dispose the electronic components thereon prior to insertion into a partial enclosure. However, it may be preferred (such as when a touch switch is utilized as a sensor for the electronic eyewear) that the electronic components be disposed on a surface of the touch switch. As used in this context, a "touch switch" may refer to a type of switch that may be touched by an object to operate (or an object may come into close proximity to the switch). For embodiments comprising electronic eyewear, it may be preferred that a capacitive touch switch is used because such switches may be moisture resistant, which the inventors have found is advantageous given the typical exposure to, for example, perspiration from the wearer, environmental moisture (e.g. humidity, precipitation), moisture from the wearer's finger, etc. A "capacitive touch switch" may refer to any sensor that may utilize an electrical field to detect, for instance, the presence of a human finger or other conducting object to activate a switch. For example, when a conductive object enters the field (e.g. comes into contact with, or in close proximity to, the device), the switch recognizes a change in the capacitance indicating an actuation. This may enable capacitive switches to be "sealed" (i.e. there may not need to be any physical interaction with the sensing components) such that, as noted above, the switches and components thereof need not be exposed to external conditions (e.g. moisture).

The inventors have also discovered that when using a capacitive touch switch as the platform (or "backbone") of the device, the typical material that may be used for a capacitive touch switch may not be firm enough to support each of the electronic components. Thus, in some embodiments, the capacitive touch switch may comprise a material that may be capable of supporting the force applied by the electronic components when disposed thereon. Moreover, the firmer material may be capable of specifically molding such that it may be structurally fitted to the enclosure, and thereby adhesives or fasteners may not be required to couple the two components together (e.g. after the electronic assembly of electronic components is disposed on the surface of the capacitive touch switch). For instance, the capacitive touch switch may be pressure fitted to the enclosure, such that it may be "snapped-in" or out (i.e. coupled and decoupled). This may enable easy access to the components disposed therein, which could reduce maintenance and repair costs.

It should be noted that although embodiments described below may make reference to a capacitive touch switch because the inventors may have found that it has properties that make it well-suited in some instances for use on electronic eyewear as described above, embodiments are not so limited. For example, as noted above, other types of touch switches such as membrane switches may also be used. Thus, while the exemplary embodiments provided herein may be described with reference to a capacitive touch switch because of the advantages that the inventors have found such devices may provide in some embodiments, it should be understood that the methods described herein may also be utilized using other types of substrates as a platform for the electronic components.

Additional steps may also be performed as well in some embodiments. For instance, some embodiments include the step of depositing a conformal layer (e.g. an encasing or encapsulating layer) over the electronic assembly (i.e. comprising the capacitive touch switch and the electronic components disposed thereon) using a film or other protective material layer. This conformal layer may be utilized to seal the electronic components (and particularly the electrical connections between the electronic components) to protect them from damage, particularly external environmental damage. Thus, the conformal layer may generally be moisture proof in some embodiments. However, the entire assembly may not be covered by the conformal layer in some embodiments because one or more electrical connections may be needed to, for instance, electrically couple the electronic components in the electronics module to other electronic components on the electronic eyewear. Thus, during the deposition of the conformal layer (e.g. the encasing or encapsulation process) a mask may be disposed over the electrical contacts that will be used to make such connections. In some embodiments, rather than using a mask, the entire assembly may be encased or encapsulated, and the conformal layer may be selectively removed from portions of the assembly (e.g. portions of the layer that cover the electrical contacts) to expose the electrical contacts and allow one or more connections to be made. The electronic assembly may then be inserted into a partial enclosure (e.g. an electronics module outer casing) and then disposed within the cavity of a temple of the electronic eyewear.

It should be appreciated that additional steps may be utilized during the manufacturing process. Provided below are exemplary methods of manufacturing a device that may comprise the steps of disposing one or more electronic components on a capacitive touch switch and then disposing the assembly into a partial enclosure. These example embodiments are provided for illustration purposes only and are not invented to be limiting.

In some embodiments, a first method may be provided. The first method may include the steps of providing a capacitive touch switch, disposing a plurality of electronic components on the capacitive switch, and coupling the capacitive touch switch to a partial enclosure.

As used in this context, a "partial enclosure" may refer to a component or components that may substantially surround the electronic components that are disposed on a surface of the capacitive touch switch. That is, for instance, the enclosure may surround the portions of the electronic components that are not covered by the capacitive touch switch. However, the enclosure need not completely enclose or encircle the electronic components. For example, the enclosure may have one or more openings that allow external components to interact with the components disposed within the enclosure. This may enable electrical connections to be made to the components therein.

As used in this context "disposing the electronic components" may comprise any suitable manner of coupling the electronic components to the capacitive touch switch. For example, any suitable adhesive could be used. In some embodiments one or more electrical connectors may be coupled to the capacitive touch through reflow soldering. In general, the electronic components need not all be directly coupled to the capacitive touch switch, but may, for instance and in some embodiments, be disposed or connected to other electronic components that may be directly coupled to the capacitive switch. Such indirect connections through one or more other electronic components (such as electrical connectors) may also be considered as being "disposed" on the capacitive touch switch, as used in this context. Electrical connections could be established in any suitable manner, including using traditional soldering or through the use of a reflow soldering process.

The term "providing" is generally used in this context to be an inclusive term and encompass any manner of obtaining or making available a capacitive touch switch for use in such methods. For instance, in some embodiments, the capacitive touch switch and/or components thereof may be acquired, such as by purchase from a third party. In some embodiments, the capacitive touch switch could be manufactured or assembled, or the components could be provided to a third party that may then assemble the capacitive touch switch.

In general, by disposing the electronic components on the capacitive touch switch, some embodiments may enable the electronic components to be disposed, arranged, and electrically coupled before being inserted into a confined space (such as the partial enclosure—e.g. an electronics module or the outer casing thereof). As explained above, this process may reduce the costs and complexities associated with manufacture (e.g. the coupling of the components and establishing of the electrical connections) because this fabrication process can be done in a less restrictive environment, which provides easier access to the electronic components and electrical connections there between. That is, as noted above, typically when fabricating and electrically coupling electronic components when the components are already disposed within an enclosure (such as an electronics module), the space restrictions may make it difficult to accurately and efficiently form the electrical connections, particularly when attempting to use traditional soldering techniques. This can result in shorts forming across electrical connections and/or otherwise result in damage to the electrical connections. Moreover, this process is typically done by hand because of the space restrictions, which greatly reduces manufacturing speed and increases human error in the process.

In contrast, some embodiments provided herein may, but need not, enable the use of a more efficient manufacturing process where the electrical components are fabricated and electrically connected outside of the confines of an enclosure. The partial enclosure, rather than potentially serving as the foundational structural component for disposing the electronic components, may more or less serve to protectively encapsulate a complete (or substantially complete) circuit assembly that includes a capacitive touch switch, control components, and in some embodiments, a power source. This may enable a more automated manufacturing process (i.e. the components may no longer need to be electrically coupled manually), or otherwise increase the fabrication yield and efficiency.

In some embodiments, in the first method as described above, the first method may further include the step of electrically coupling one or more of the plurality of electronic components to the capacitive touch switch. This may comprise any suitable technique for electrically coupling the components. The inventors have found, however, that in some embodiments, it may be preferred that the step of electrically coupling one or more of the plurality of electronic components to the capacitive touch switch may comprise reflow soldering. "Reflow soldering" may refer to a process in which a solder paste (e.g. a sticky mixture of powdered solder and flux) is used to temporarily attach one or several electrical components to their contact pads (e.g. electrical contacts), after which the entire assembly may be subjected to controlled heat, which melts the solder, permanently connecting the joint. Thus, for instance, the solder paste may be disposed so as to temporarily couple one or electronic components (e.g. electrical connectors or flex circuits) to the capacitive touch switch and the entire assembly may then be heated so as to permanently couple the components. This process may be more efficient than attempting to hand solder each component, and may also provide an efficient manner of coupling the components. However, as noted above embodiments are not so limited, and any suitable process may be used to electrically and physically couple the components.

In some embodiments, in the first method as described above, the first method may further include the step of electrically coupling one of the plurality of electronic components to another of the plurality of electronic components. That is, the electronic components that are disposed on the capacitive touch switch may also be electrically coupled to one another. For instance, two electronic components that are each coupled to the capacitive touch switch may also be electrically connected. For example, a controller that may be coupled the capacitive touch switch may also be electrically connected to a power source or an electrical connector. In addition, electronic components may be both directly and indirectly coupled to the capacitive touch switch. For example, an electrical connecter or flexible circuit may be directly coupled to the capacitive touch switch, and then an additional electronic component may be coupled to the electrical connector of flexible circuit (but not directly to the capacitive touch switch). This may enable stacking of the electronic components.

In some embodiments, in the first method as described above, the first method may further include the step of coupling the enclosure to a temple of an eyeglass (i.e. eyewear) frame. In some embodiments, the step of coupling the enclosure to the temple of the eyeglass frame may comprise disposing the enclosure substantially within the temple of the eyeglass frame. The enclosure may be maintained with the temple by any suitable means, such as through the use of adhesives, fasteners, or electrical conductors, such as the exemplary embodiments described above and illustrated in FIGS. 1-18. In some embodiments, the electronic eyeglass frame may comprise an electro-active eyeglass frame (i.e. it may comprise an electro-active lens, such a dynamic or electro-chromic lens).

In some embodiments, the electronic eyeglass frame may comprise a first conductive path, and the first method may further comprise the step of electrically coupling at least one of the electronic components to the first conductive path. Examples of such connections were described above, particularly with reference to FIGS. 11 and 15-16. In some embodiments, the first conductive path may be electrically coupled to an electro-active lens. In some embodiments, the first conductive path may comprise anyone of, or some combination of: a slip ring or a pogo pin. A slip ring or a pogo ping may generally be used to maintain a conductive path through the temple and the lens housing, even as the temple is moved relative to the lens housing. In some embodiments, where the first conductive path includes a slip ring, the first conductive path may further comprise a lug coupled to the slip ring. In some embodiments, the lug may be integrally coupled to the temple. Examples of such embodiments are described in detail above, particularly with reference to the electronic eyewear shown in FIGS. 1-18. In some embodiments, the first method may further include the step of insert molding the lug into the eye glass frame.

In some embodiments, the lug may be disposed on the capacitive touch switch. That is, in some embodiments, unlike the exemplary embodiments shown in FIGS. 1-18, the lugs that comprise a part of the first conductive path may be disposed on the capacitive touch switch (which may be coupled to the electronics module). The lugs thereby may not be integrally coupled to the temple.

In some embodiments, in the first method as described above, the enclosure may comprise an electronics module. In some embodiments, the enclosure may comprise a temple of an eyeglass frame. That is, for instance, in some embodiments a separate electronics module may not be utilized to enclose the electronic components. Instead, the capacitive touch switch and the electronic components disposed thereon may be directly inserted and coupled to the temple. In this manner, the temple of the frames may provide structural support and protection for the components, without requiring the extra step of enclosing the components in a module.

In some embodiments, in the first method as described above, the first method may further comprise the step of applying a conformal coating to the plurality of electronic components. As used in this context, a "conformal coating" may refer to any coating that is designed to substantially protect or enclose the electrical connections of the plurality of electronic components (and/or the components themselves) that are disposed on the capacitive touch switch. The conformal coating may also protect portions of the capacitive touch switch as well. The conformal coating may be configured to prevent short circuits, foreign materials, atmospheric conditions (such as moisture) or any other external forces from affecting the electrical connections or damaging the electronic components. In this regard, the coating may generally be moisture proof or resistant. The conformal coating may have any suitable thickness, but is typically less than 1 mm thick, and more preferably less than 0.5 mm thick. The coating may comprise any suitable material, such as a brushed, spray or dip applied acrylic, urethane, silicone, or epoxy. It should be noted that components that are intended to form one or more electrical connections with an external component(s) may be masked during the deposition/application process of the conformal coating (or the coating may be later removed) so as to expose the electrical contacts of these components.

In some embodiments, the first method may further include the step of masking a portion of the electronic components such that an electrical contact is exposed through the conformal coating. In some embodiments, the first method may further include the step of removing a portion of the conformal coating to expose an electrical contact of one or more of the plurality of electronic components.

In some embodiments, in the first method as described above, the plurality of electronic components may comprise any one of, or some combination of: a flexible circuit, a printed circuit board, or an electrical connector. In some embodiments, the plurality of electronic components may include a power source.

In some embodiments, in the first method as described above, the capacitive touch switch and the enclosure may be configured to be pressure fitted. As noted above, the capacitive touch switch may be coupled to the enclosure in any suitable manner. However, the inventors have found that pressure fitting the capacitive touch switch to the enclosure may provide for more efficient assembly, as well as easier access to the components disposed on the capacitive touch switch after the capacitive touch switch has been initially coupled to the enclosure. For instance, if an adhesive were used, the capacitive touch switch may be damaged if it was decoupled from the enclosure. However embodiments are not so limited, and in some instances, in the first method as described above, the capacitive touch switch may be coupled to the enclosure using any one of, or some combination of: a fastener or an adhesive.

In some embodiments, in the first method as described above, the capacitive touch switch may comprise a stiff material. As used in this context, "stiff" may refer to a material that substantially maintains its shape when the plurality of electronic components is disposed thereon. In some embodiments, in the first method as described above, the capacitive touch switch may comprise a rigid, molded plastic such as a liquid crystal polymer or other plastic engineered for ablation and plating.

In some embodiments, a method may be provided. The method may include the steps of providing a substrate (such as a surface of touch switch), disposing a plurality of electronic components on the substrate, electrically coupling one of the plurality of electronic components to another of the plurality of electronic components, coupling the substrate to a partial enclosure, and coupling the enclosure to a temple of an eyeglass frame. That is, as noted above, although it may be preferred that a capacitive touch switch is used in some embodiments, embodiments are not so limited. Indeed, disposing the electronic components on a substrate and forming one or more electrical connections prior to coupling the substrate to a partial enclosure may provide similar manufacturing advantages (e.g. allow for automatic pick and place of the electronic components) when using different types of substrates. In some embodiments, the step of coupling the enclosure to the temple of the eyeglass frame may comprise disposing the enclosure substantially within the temple of the eyeglass frame.

With reference to FIGS. 19-29, exemplary embodiments of electronic assemblies comprising a capacitive touch switch and methods for manufacturing the same are provided. These exemplary devices and methods are provided for illustration purposes and are not intended to be limiting.

Figure 19:
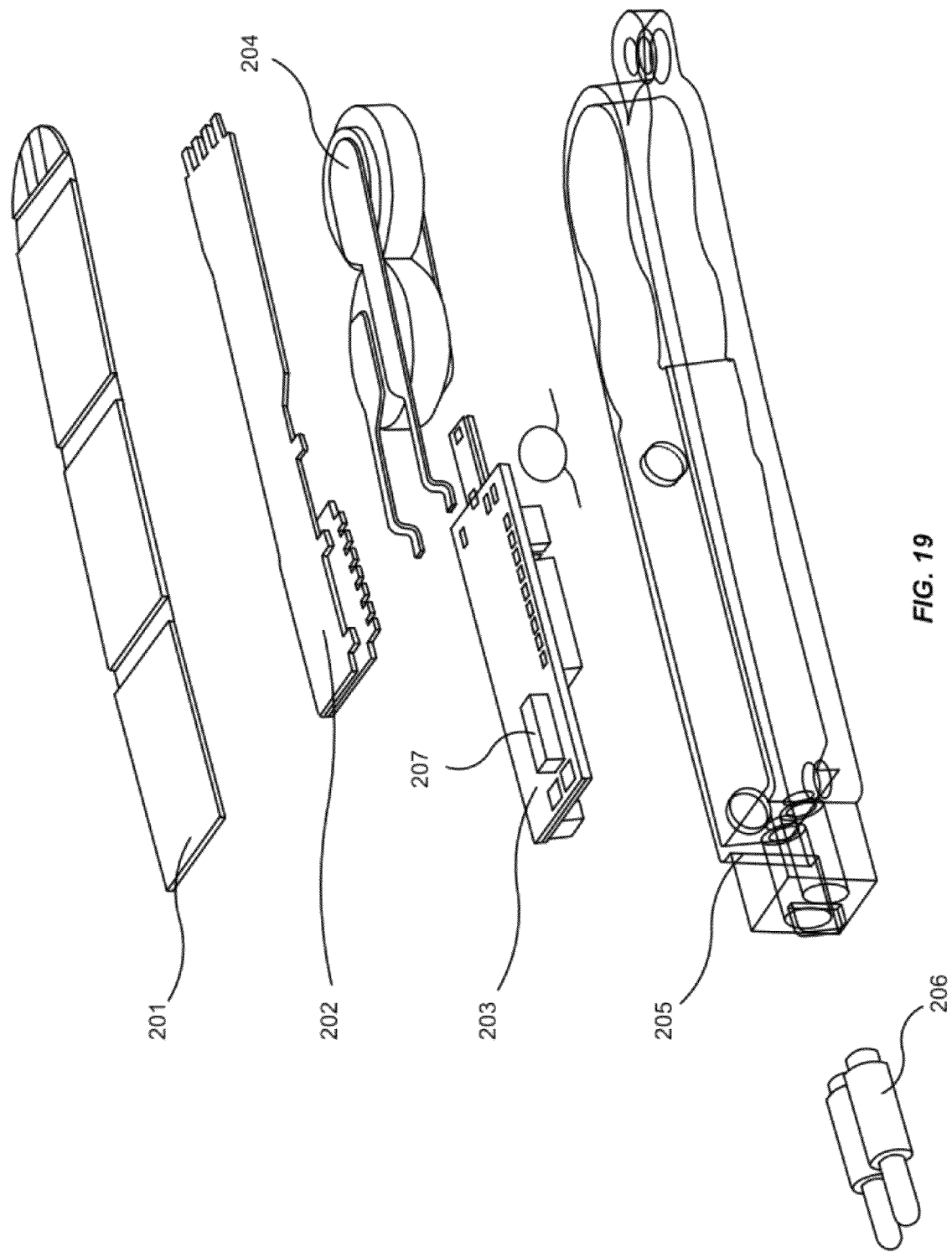
FIG. 19 is an illustration of the various components that comprise a current electronics module, including a capacitive touch switch.

With reference to FIG. 19, the components of a current design of an electronics module are shown. As illustrated, this device may comprise a capacitive touch switch 201, a flexible circuit 202 that may be electrically coupled to the capacitive touch switch 201, a printed circuit board (PCB) 203, a power source 204 (e.g. a battery assembly), a partial enclosure 205 (e.g. outer casing of an electronics module), electrical conductors 206 (e.g. pogo pins) that may form one or more connections between the electronic components disposed inside the electronics module to electronic components that may be disposed outside the module, and electrical component 207 coupled to the PCB 203. The device shown in FIG. 19 corresponds to embodiments where the electronic components are first disposed in the electronics module, electrical connections are then formed, and then capacitive touch switch 201 is coupled to the electronics module (e.g. via super glue) and functions as a seal for a potting that is used to fill the vacant space in the module after the electrical connections are formed. The components are hand soldered, including the electrical connections of the pogo pins 206 to the electronic components inside the electronics module, which as described above, increases manufacture time and reduces the reliability of the device (e.g. by increasing manufacturing error). Indeed, many of the electronic components are subject to short faults during and after the fabrication process.

Figure 20A:
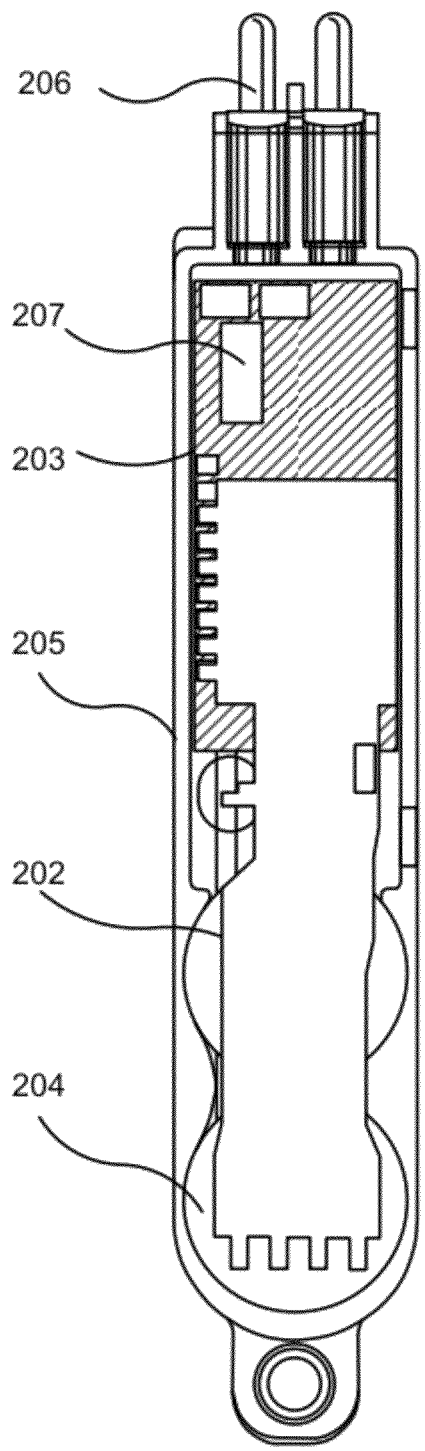
FIG. 20(a) is an illustration of a top view and FIG. 20(b) is a cross-sectional view of the electronics module and component shown in FIG. 19.
Figure 20B:
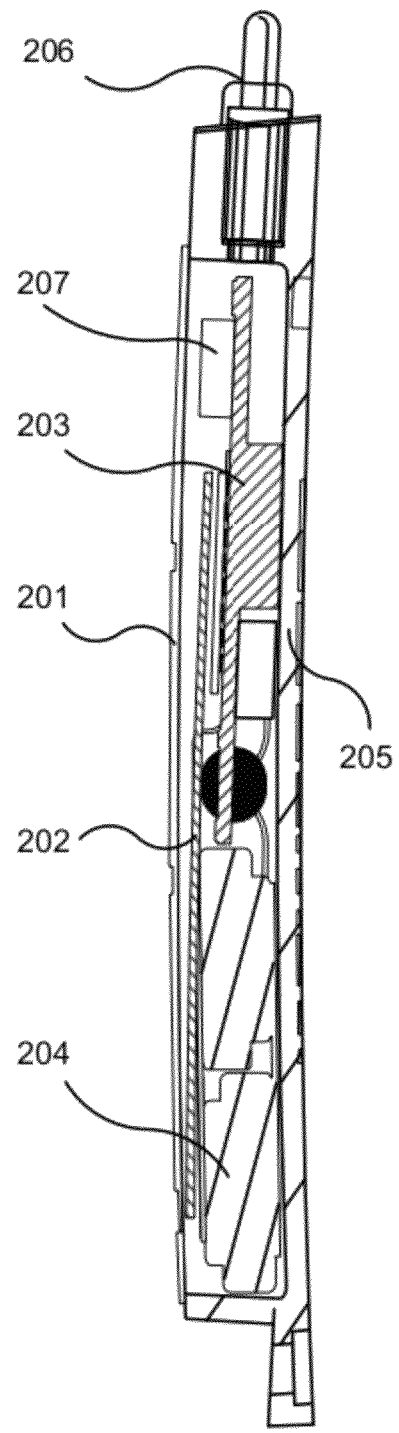

FIG. 20(*a*) shows a top view and FIG. 20(*b*) shows a cross-sectional view of the device of FIG. 19. As illustrated, this device comprises a capacitive touch switch 201 (not shown in the top-view of FIG. 20(*a*) for illustration purposes), a flexible circuit 202 that may be electrically coupled to the capacitive touch switch 201, a printed circuit board (PCB) 203, a power source 204 (e.g. a battery assembly), a partial enclosure 205 (e.g. outer casing of an electronics module), electrical conductors 206 (e.g. pogo pins) that may form one or more connections between the electronic components disposed inside the electronics module to electronic components that may be disposed outside the module, and electronic component 207 coupled to the PCB 203. As can be seen in FIG. 20(*b*), the components are disposed along the bottom surface of the enclosure 205, creating a separation from some of the components and the capacitive touch switch 201 that is functioning as the seal for the electronics module. That is, for example, the components are first disposed in the partial enclosure 205, electrically connections may be formed between some of the components, and then the capacitive touch switch 201 may be super glued to the top surface of the enclosure 205. As described above, this results in numerous deficiencies in the manufacturing process, and increases the risk of defects in the device (particularly because of the need to manually solder the electrical connections).

Figure 21:
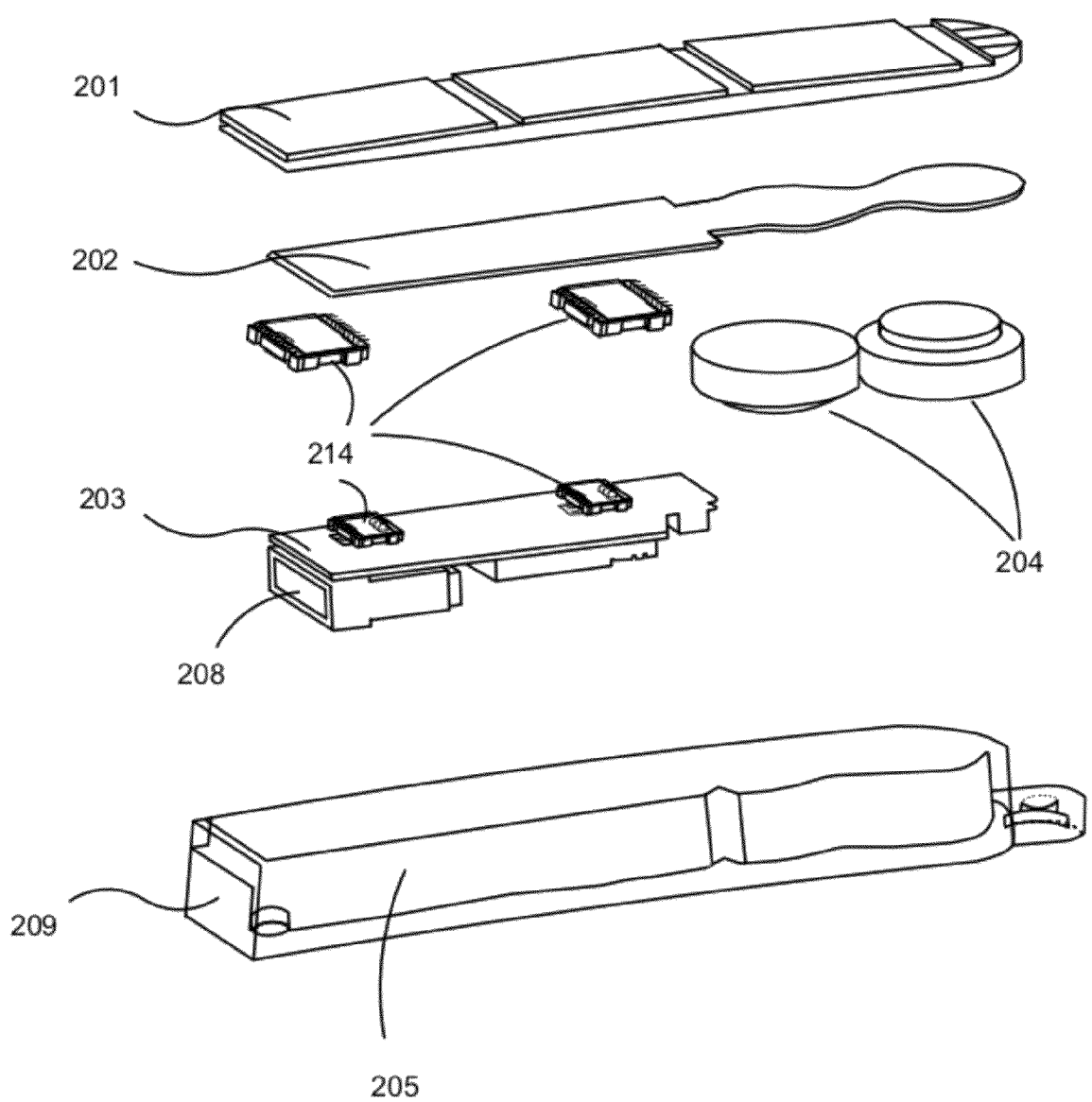
FIG. 21 is an illustration of the various components that could comprise an exemplary electronics module that includes a capacitive touch switch in accordance with some embodiments.
Figure 22:
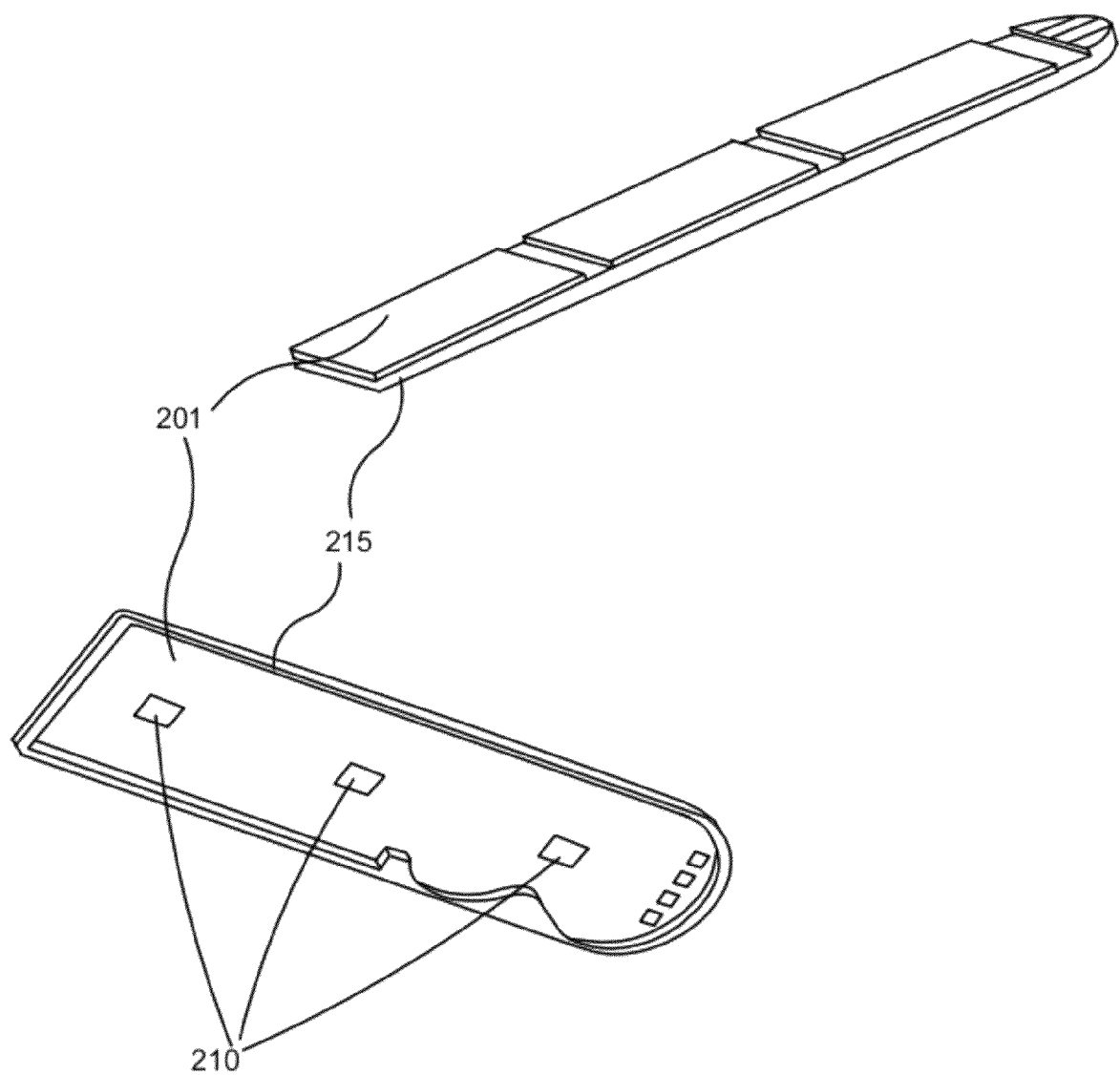
FIG. 22 is an illustration of an exemplary capacitive touch switch comprising reflow solder in accordance with some embodiments.

With reference to FIG. 21, the components of an exemplary design of an electronics module in accordance with some embodiments are shown. As illustrated, this device may comprise a capacitive touch switch 201 (such as a molded capacitive touch switch 201 that may be fitted so as to be coupled to the enclosure 205), a flexible circuit 202 that may be electrically coupled to the capacitive touch switch 201, a printed circuit board (PCB) 203 having an electrical contact or connector 208, a power source 204 (e.g. a battery assembly), a partial enclosure 205 (e.g. an outer casing of an electronics module), and electrical connectors 214 that may be configured to electrically couple the flex 202 to the PCB 203. The molded capacitive touch switch 201 shown in this example may be formed in any suitable manner, such as by using Laser Direct Structuring (LDS) to create a switch curvature that can "snap" into an enclosure 205 (as opposed to being glued or welded); however, embodiments are not so limited and any suitable method of coupling the capacitive touch switch 201 to an enclosure 205 may be used. The enclosure 205 may include an opening 209 through which one or more electrical conductors may be disposed and that may form a conductive path to the electrical contact 208 that is electrically coupled to the PCB 203.

As noted above, electrical connections may be made between the capacitive touch switch and one or more of the electronic components using any suitable method, including re-low soldering. Thus, with reference to FIG. 22, the exemplary capacitive touch switch 201 is shown as having reflow solder pads 210 disposed on its underside (i.e. the side opposite the surface that may interact with the wearer's finger). The reflow solder pads 210 may correspond to the electrical contacts of the touch switch 201, and may be used by a controller or other electronic component to receive signals from the touch switch 201 and determine an action to be performed. The inventors have found that reflow soldering may provide advantages over other methods of forming electrical connections, including that the process may be performed automatically (rather than manual soldering) and the reflow soldering processes may also be used to physically couple the components together. Thus, in this manner, electronic components may be both electrically coupled to the touch switch 201, as well as physically disposed and coupled thereto. In addition, embodiments may provide a molded capacitive touch switch design that may comprise a "snap feature" 215 that may be configured to couple the capacitive touch switch 201 to the enclosure 205.

Figure 23:
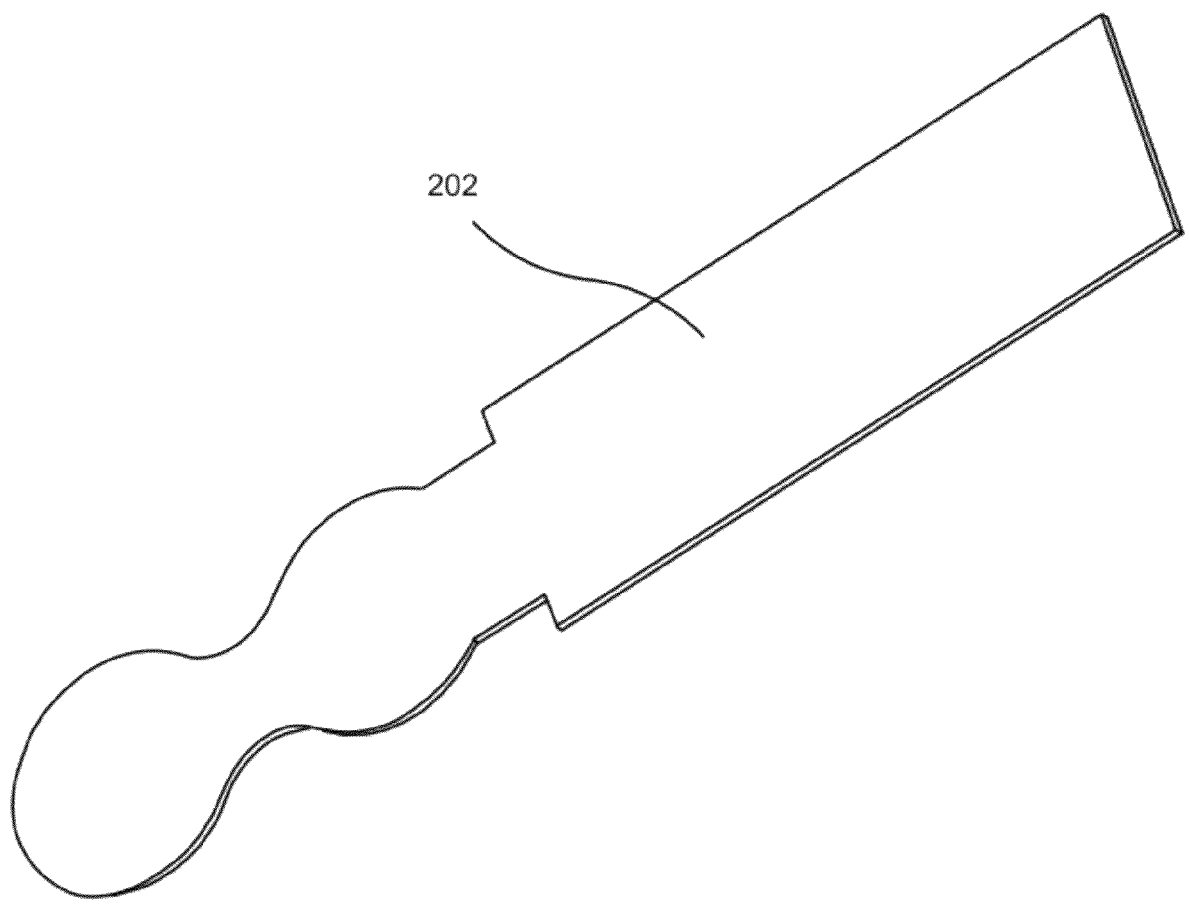
FIG. 23 is an illustration of an exemplary flex circuit which may be included in an electronics module in accordance with some embodiments.

With reference to FIG. 23, in some embodiments, an intermediate flexible circuit 202 may be utilized, which may be soldered to the capacitive touch switch 201 so as to provide a ground plane and electrical connectors (e.g. connectors 214, such as 1 mm stack-height connectors) to other electronic components. In addition, the flex 202 may be electrically connected to a power source and comprise additional electronic components (such as controllers) to provide additional layout options and otherwise provide flexibility in design and footprint of the electronic assembly.

Figure 24:
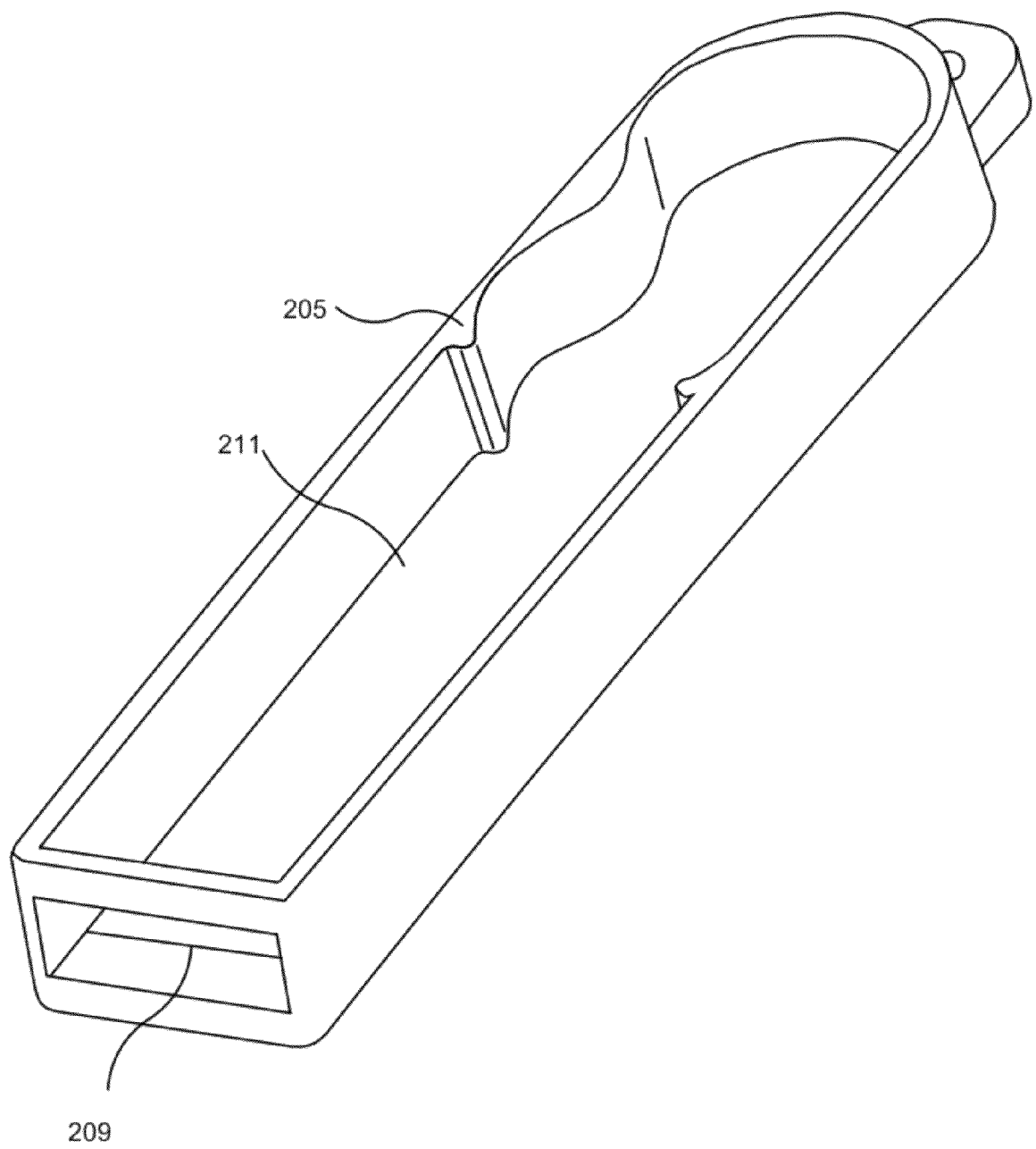
FIG. 24 is an illustration of an exemplary electronics module outer casing in accordance with some embodiments.

With reference to FIG. 24, the partial enclosure 205 that may be utilized in some embodiments may be in the form of a traditional outer casing of an electronics module; however, embodiments are not so limited. For instance, the utilization of fabrication methods such as those described herein may allow for an enclosure 205 that has, for instance, a smaller geometry (based on the reduction of unused spaced within the module because of the increased design flexibility provided by constructing the electronic assembly outside the enclosure on the capacitive touch switch); a snap feature deposed around the perimeter (corresponding to the snap feature 215 of the capacitive touch switch 201), which may eliminate the need to use an adhesive in some embodiments; and, in some instances, the enclosure 205 could comprise electrical traces disposed on the bottom surface to allow for a battery assembly circuit leg across the enclosure (or to certain components), which may not be practical in some embodiments where the electronic components are disposed on the bottom surface of the enclosure 205 (rather than disposed on the capacitive touch switch 201).

Figure 25:
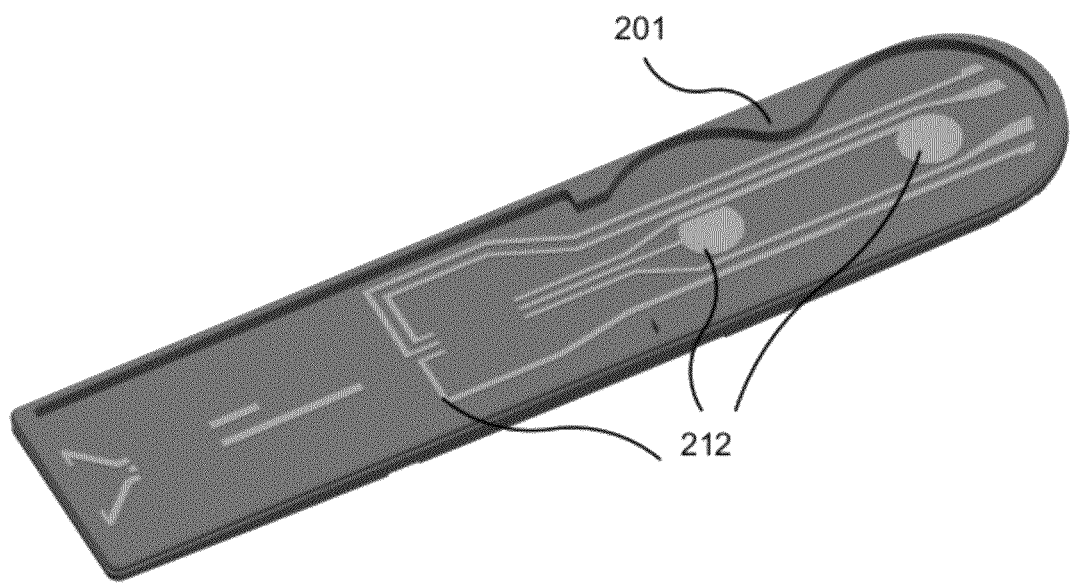
FIG. 25 is an illustration of an exemplary molded capacitive touch switch which further shows exemplary traces in accordance with some embodiments.
Figure 26:
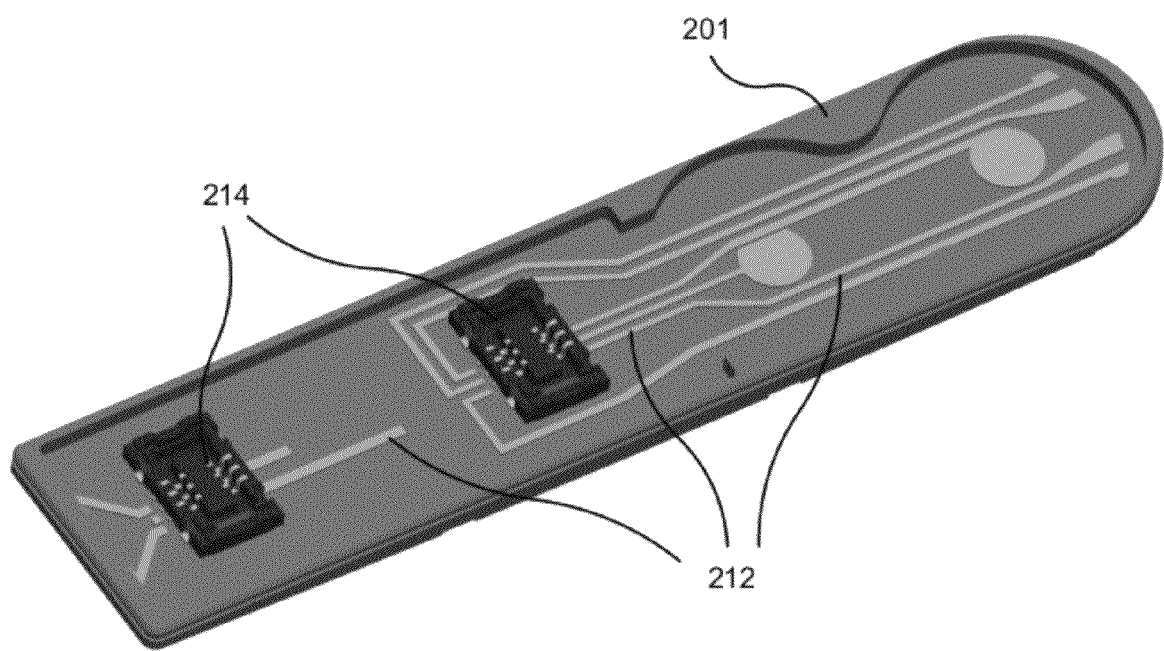
FIG. 26 shows the exemplary molded capacitive touch switch of FIG. 25 having exemplary electrical components disposed thereon in accordance with some embodiments.

With reference to FIG. 25, an exemplary capacitive touch switch 201 is shown as having electrical traces 212. The electrical traces 212 may be electrically coupled to one or electronic components (not shown), and may thereby send signals from the capacitive touch switch 201 (such as indications of when a wearer interacts with the capacitive touch switch 201) to one or more devices that may be utilized to active or deactivate an electronic function of the eyewear. FIG. 26 shows the same capacitive touch switch 201 as in FIG. 25, but with electrical connectors 214 disposed on the surface of the capacitive touch switch 201. In some embodiments, the electrical connectors 214 may be reflow soldered to the surface of the capacitive touch switch 201, which may also be used to form one or more electrical connections with the electrical traces 212.

Figure 27:
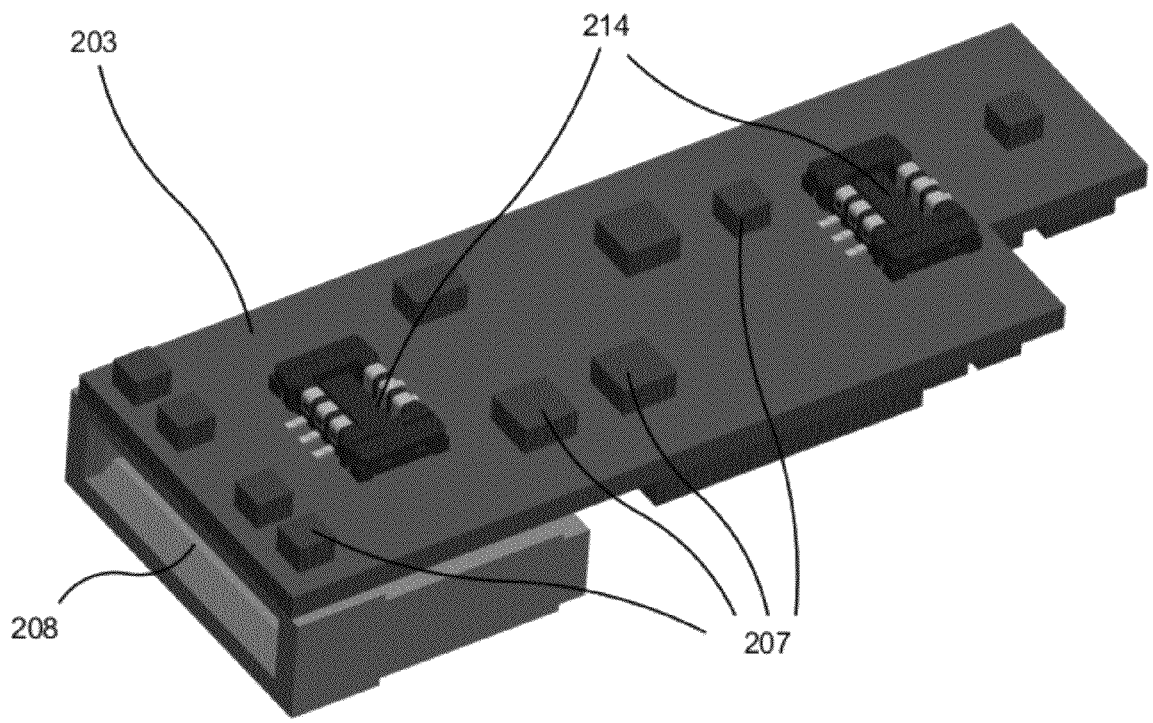
FIG. 27 is an illustration of an exemplary printed circuit board in accordance with some embodiments.

FIG. 27 shows an exemplary printed circuit board (PCB) 203 having a plurality of electrical connectors 214 and electronic components 207 disposed thereon. The electrical components 207 may provide any functionality required, such as a current or voltage control for the device, or may function as a controller (i.e. the components may control the electronic functionality provided by electronic devices disposed on the electronic eyewear based on signals received from the capacitive touch switch 201). The electrical connectors 214 may couple to the corresponding electrical connectors 214 that may be reflow soldered to the surface of the capacitive touch switch 201 as shown in FIG. 26 (and thereby couple the PCB 203 to the capacitive touch switch 201).

Figure 28:
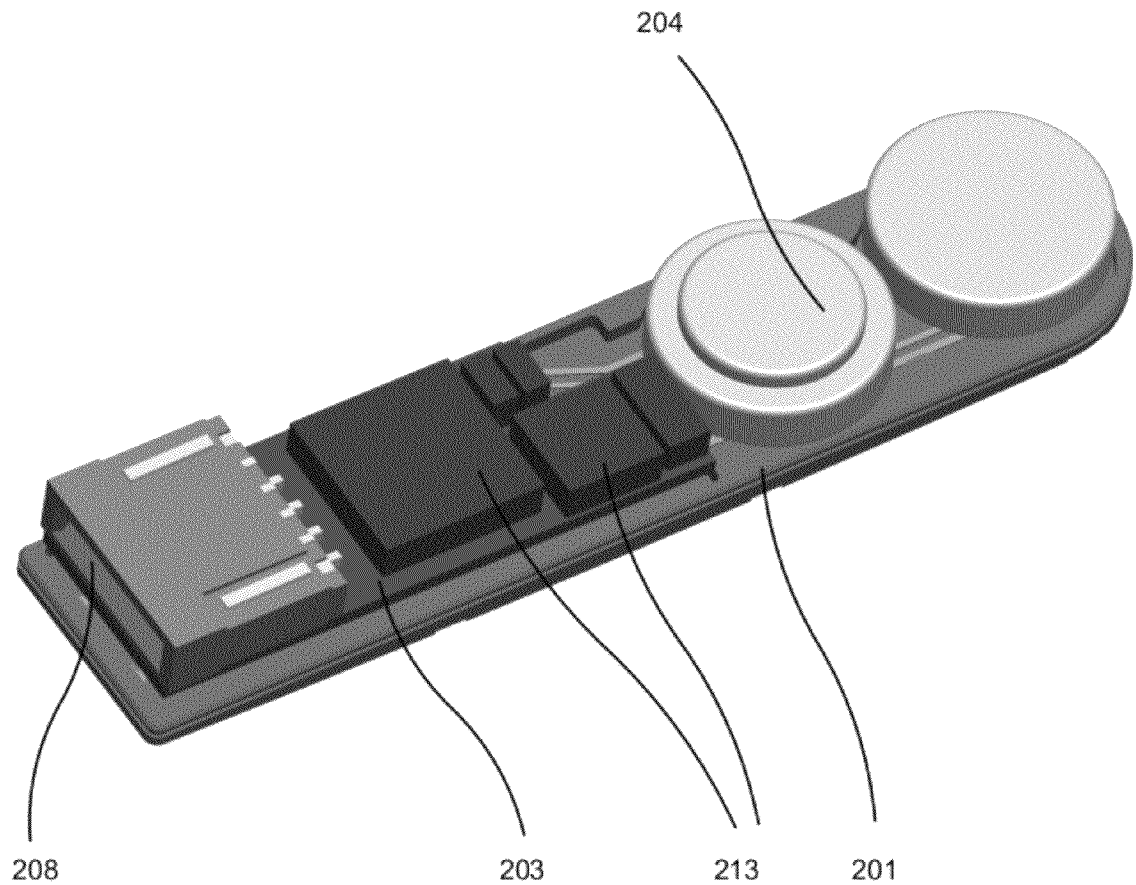
FIG. 28 shows the exemplary molded capacitive touch switch in the above figures having additional exemplary electrical components including the exemplary printed circuit board of FIG. 28 disposed thereon in accordance with some embodiments.
Figure 29:
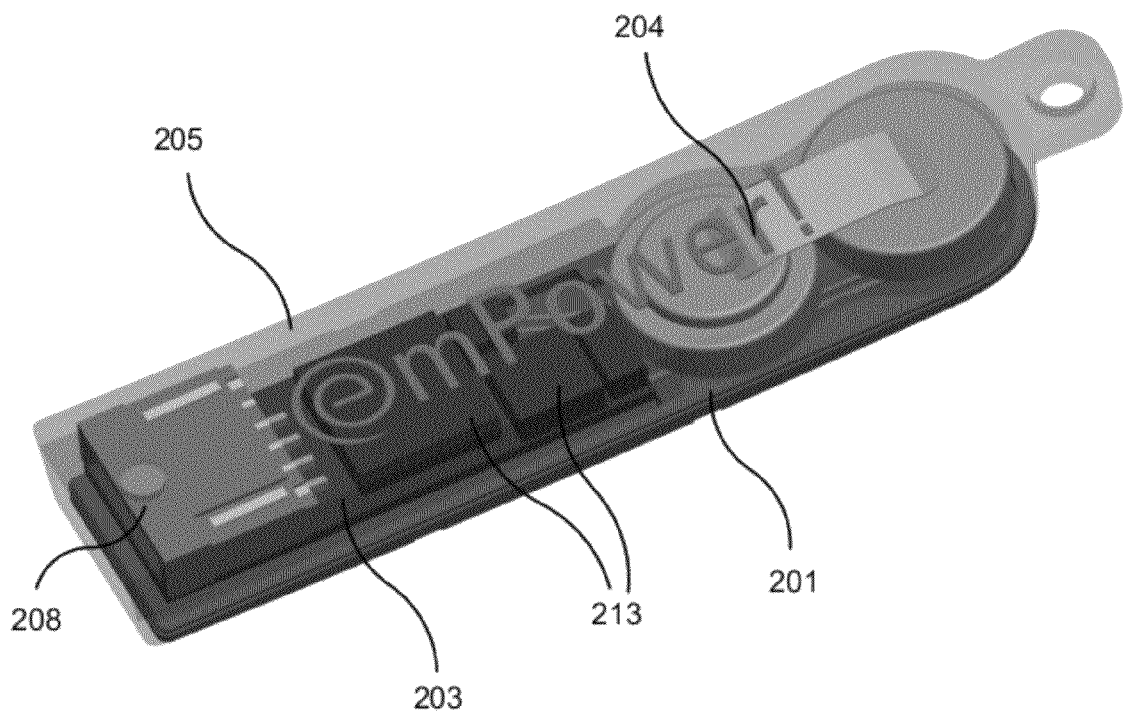
FIG. 29 shows the exemplary molded capacitive touch switch having exemplary electrical components disposed thereon disposed within in electronics module in accordance with some embodiments.

FIG. 28 shows a plurality of electronic components disposed on the capacitive touch switch 201. As shown in this exemplary embodiment, the components have been disposed on the capacitive touch switch 201 prior to the assembly being inserted into an enclosure 205, such as the outer casing of an electronics module. The PCB 203 may have been coupled to the capacitive touch switch 201 through the electrical connectors 214 (not shown). In some embodiments, and as shown in FIG. 28, a power source 204 may also be coupled to the capacitive touch switch 201 prior to the assembly being disposed within a partial enclosure 205; however, embodiments are not so limited, and in some instances, the power source 204 may be disposed in the enclosure 205 separately or may be located in a different portion of the electronic eyewear. The PCB 203 may comprise any number of electronic components 213, which may be disposed on the PCB 203 before or after the PCB 203 is disposed on the capacitive touch switch 201. In the example embodiment shown in FIG. 28, the PCB 203 also has coupled thereto an electrical connector 208 comprising a structure that may be utilized to both electrically and physically couple the PCB 203 (and thereby the other electronics components and the electronics assembly in general) to one or more conductors that may be disposed in, or otherwise coupled to, the electronic eyewear frames. FIG. 29 shows the exemplary device and components illustrated in FIG. 30 disposed within a partial enclosure 205. The opposite side of the enclosure may comprise an opening such that the surface of the capacitive touch switch 201 may be exposed and interacted with by a wearer of the electronic eyewear.

Figure 30:
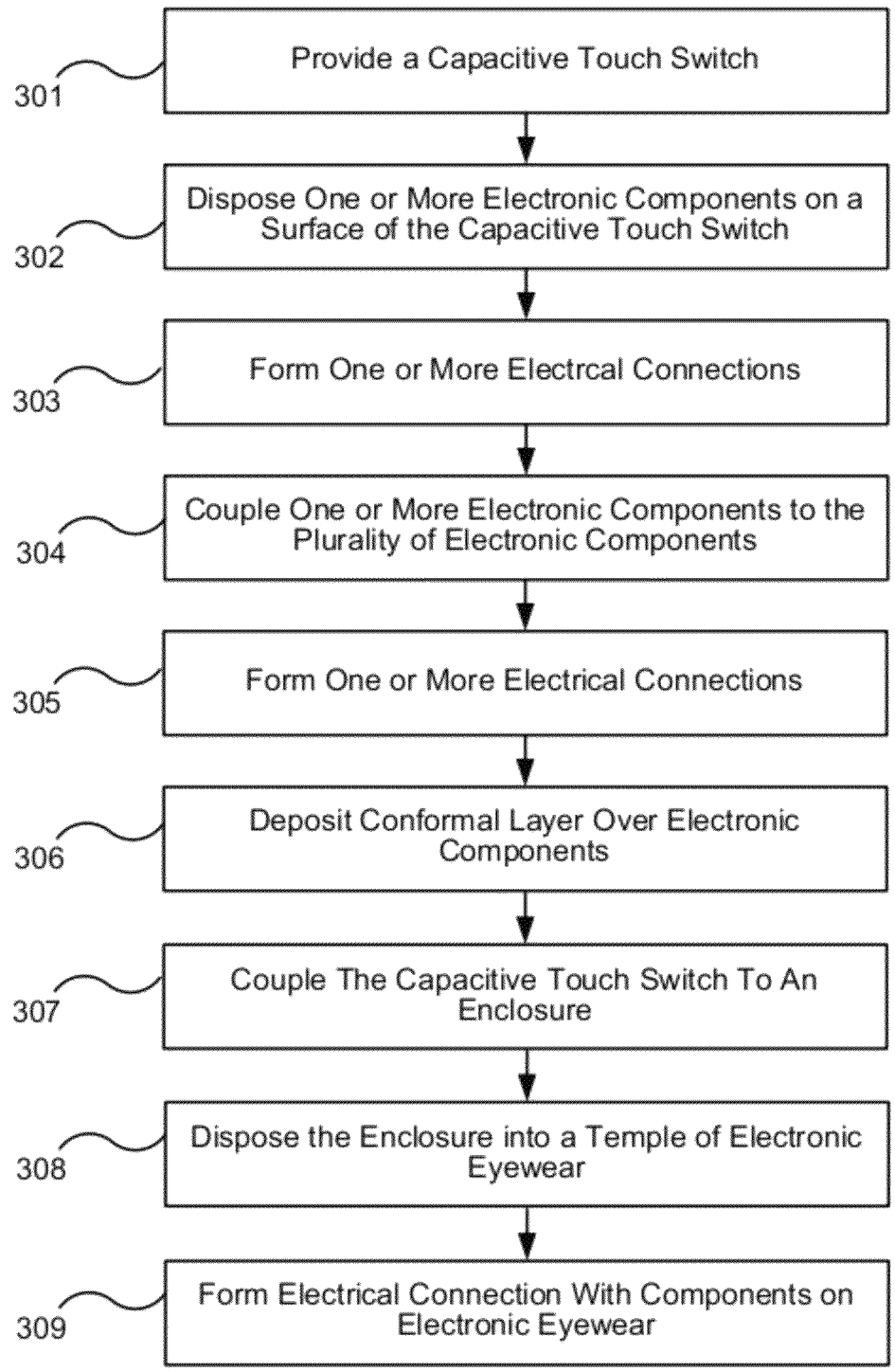
FIG. 30 is a flow chart of an exemplary fabrication method in accordance with some embodiments.

FIG. 30 is a flow chart that illustrates exemplary steps that may be performed in accordance with some methods provided herein. For example, at step 301 a capacitive touch switch may be provided. The capacitive touch switch may serve as the platform or "back bone" on which some of the electronic components of an electronics module or electronic eyewear may be disposed. Next, at step 302, one or more electronic components may be disposed on a surface of the capacitive touch switch. For instance, as shown in FIG. 26, electrical connectors may be disposed on the surface (e.g. using reflow soldering). However, embodiments are not so limited, and the components may be coupled to the surface of the capacitive touch switch in any suitable manner. In step 303, one or more electrical connections may be formed between the capacitive touch switch and the electronic components that were coupled to the capacitive touch switch in step 302. In some embodiments, the electrical connections may be formed simultaneously with step 302, such as when reflow soldering is used; however, embodiments are not so limited.

Continuing with reference to FIG. 30, at step 304 one or more electronic components may be coupled to the one or more of the electronic components that were previously disposed on the capacitive touch switch in step 302. For instance, electrical connectors coupled to a PCB may be coupled to one or more electrical connectors that may have been reflow soldered to the capacitive touch switch. In this manner, an electronic assembly may be created, wherein each additional electronic component may connect to another electronic component or components. Each of these additional electronic components may be considered to be disposed on the capacitive touch switch, as used in this context. At step 305, one or more electrical connections may be formed, to the extent that this was not performed during step 304.

In some embodiments, at step 306, a conformal layer (e.g. an encasing or encapsulating layer) may be deposited over some or all of the electronic assembly that is now disposed on the capacitive touch switch. The conformal layer may be used to seal and protect the electrical connections that were formed in steps 303 and/or 305, as well as to protect the electronic components themselves (such as from moisture, which could damage or affect device performance). As described above, to the extent electrical contacts may be required so as to form electrical connections with other components that are not part of the electronic assembly disposed on the capacitive touch switch, these electrical contacts may be masked during the deposition process of the conformal layer, or the conformal (i.e. encapsulation) material may be subsequently removed to expose the electrical contacts. It should be noted that while it may be preferred in some embodiments to include a conformal layer, embodiments are not so limited. In some embodiments, the conformal layer may have a thickness that is less than 1 mm in thickness (preferably less than 0.5 mm).

At step 307, the capacitive touch switch (which comprises the assembly of electronic components that were disposed thereon in steps 302 and 304) may be coupled to an enclosure. As described above, the enclosure may comprise the outer casing of an electronics module or the cavity of a temple of electronic eyewear. The step of coupling the capacitive touch switch to the enclosure may comprise any suitable method, including pressure fitting the two components (if they are designed and configured to have the structural interface to do so). The enclosure may provide protection for the electronic components from external forces, but need not necessarily support the components because they may be supported by the capacitive touch switch. As noted above, the capacitive touch switch, or at least a portion thereof, may comprise a material that may be firm enough to substantially maintain its shape and structure, even with the electronic components disposed thereon. Finally, at step 309, one or more electrical connections may be formed between the components disposed on the capacitive touch switch (e.g. that may now be disposed within an electronics module) and one or more electronic components disposed on the electronic eyewear. Examples of such connections were described above with reference to the exemplary embodiments shown in FIGS. 1-18; however, embodiments are not so limited.

The exemplary methods were described above for illustration purposes. One or more of the steps may not be performed in some embodiments, or additional steps may be included as would be understood by one of ordinary skill in the art after reading this disclosure.

CONCLUSION

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore includes variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A first device, comprising:
    a lens housing adapted to support a first lens and a second lens;
    a first temple movably coupled to the lens housing;
    a second temple movably coupled to the lens housing;
    an electronics module disposed at least partially within the first temple;
    a first electrical conductor coupled to the first temple,
        wherein a first conductive path is provided from the first temple to the lens housing at least in part by the first electrical conductor; and
    a second electrical conductor coupled to the first temple,
        wherein a second conductive path is provided from the first temple to the lens housing at least in part by the second electrical conductor;
    wherein the first and second electrical conductors are configured to couple the electronics module to the first temple to constrain the electronics module.

2. The first device of claim 1, wherein the first electrical conductor is integrally coupled to the first temple.

3. The first device of claim 2, wherein the first electrical conductor is insert molded with the first temple.

4. The first device of claim 1, wherein the first electrical conductor comprises a lug.

5. The first device of claim 1, wherein the electronics module comprises any two of: a power source, a controller, and a sensor.

6. The first device of claim 5, wherein the sensor comprises a touch switch.

7. The first device of claim 1, wherein the first electrical conductor is electrically coupled to a slip ring.

8. The first device of claim 7, further comprising a hinge, wherein the slip ring is disposed substantially within the hinge.

9. The first device of claim 1, wherein the electronics module is configured to be removably coupled to the first temple.

10. The first device of claim 1, wherein the electronics module comprises an opening;
    wherein the first electrical conductor has a first portion that extends a first distance of at least approximately 1 cm into the electronic module through the opening, and
    wherein the first electrical conductor has a second portion that extends second distance of at least approximately 1 cm outside of the electronics module away from the opening.

11. The first device of claim 10,
    wherein the first distance that the first portion of the first electrical conductor extends into the electronics module is at least approximately 2 cm, and
    wherein the second distance that the second portion of the first electrical conductor extends away from the opening is at least approximately 2 cm.

12. The first device of claim 1, wherein the first electrical conductor comprises a single structural element.

13. The first device of claim 1, wherein the first electrical conductor is configured to maintain the first conductive path as the first temple is moved relative to the lens housing.

14. The first device of claim 1, further comprising a first lens and a second lens coupled to the lens housing;
   wherein the first lens has a first electrical contact; and
   wherein the first conductive path is electrically coupled to the first electrical contact.

15. A first method, comprising:
   providing a capacitive touch switch;
   disposing a plurality of electronic components on the capacitive switch; and
   coupling the capacitive touch switch to a partial enclosure to constrain the capacitive touch switch.

16. The first method of claim 15, further comprising the step of disposing the enclosure substantially within a temple of an eyeglass frame.

17. The first method of claim 16,
   wherein the eye glass frame comprises electro-active eyeglass frames;
   wherein the eyeglass frame comprises a first conductive path; and
   wherein the first method further comprises the step of electrically coupling at least one of the electronic components to the first conductive path.

18. The first method of claim 15, further comprising the step of applying a conformal coating to the plurality of electronic components.

19. The first method of claim 15, wherein the capacitive touch switch and the enclosure are configured to be pressure fitted.

* * * * *